United States Patent
Banica et al.

(10) Patent No.: US 9,467,750 B2
(45) Date of Patent: Oct. 11, 2016

(54) PLACING UNOBTRUSIVE OVERLAYS IN VIDEO CONTENT

(71) Applicant: Adobe Systems Incorporated, San Jose, CA (US)

(72) Inventors: Dan Banica, Ploiesti (RO); Andrian Cucu, Bucharest (RO); Paul-Alexandru Chirita, Bucharest (RO)

(73) Assignee: Adobe Systems Incorporated, San Jose, CA (US)

(*) Notice: Subject to any disclaimer, the term of this patent is extended or adjusted under 35 U.S.C. 154(b) by 281 days.

(21) Appl. No.: 13/906,838

(22) Filed: May 31, 2013

(65) Prior Publication Data

US 2014/0359656 A1 Dec. 4, 2014

(51) Int. Cl.
| | |
|---|---|
| *H04N 21/81* | (2011.01) |
| *H04N 21/234* | (2011.01) |
| *H04N 21/8545* | (2011.01) |
| *H04N 21/44* | (2011.01) |
| *H04N 21/23* | (2011.01) |
| *H04N 21/85* | (2011.01) |
| *H04N 21/2547* | (2011.01) |
| *H04N 21/431* | (2011.01) |

(52) U.S. Cl.
CPC ............ *H04N 21/812* (2013.01); *H04N 21/23* (2013.01); *H04N 21/234* (2013.01); *H04N 21/23412* (2013.01); *H04N 21/23418* (2013.01); *H04N 21/2547* (2013.01); *H04N 21/4316* (2013.01); *H04N 21/44* (2013.01); *H04N 21/44016* (2013.01); *H04N 21/85* (2013.01); *H04N 21/8545* (2013.01)

(58) Field of Classification Search
None
See application file for complete search history.

(56) References Cited

U.S. PATENT DOCUMENTS

| 2007/0011713 A1* | 1/2007 | Abramson et al. ............ 725/113 |
| 2008/0066131 A1* | 3/2008 | Chang et al. ................. 725/113 |

(Continued)

FOREIGN PATENT DOCUMENTS

| EP | 2173090 | 4/2010 |
| GB | 2416949 | 2/2006 |
| WO | 2009/144464 | 12/2009 |

OTHER PUBLICATIONS

ComScore Releases Feb. 2012 U.S. Online Video Rankings, http://www.comscore.com/Insights/Press_Releases/2012/3/comScore_Releases_February_2012_U.S._Online_Video Rankings, Mar. 16, 2012, 3 pages.

(Continued)

*Primary Examiner* — Justin Shepard
(74) *Attorney, Agent, or Firm* — Kilpatrick Townsend & Stockton LLP

(57) ABSTRACT

Methods and systems for placing an overlay in video content are provided. A method receives video content and input indicating an overlay to be placed in the video. The method determines, based on overlay and video properties, locations where the overlay can be placed. The method presents suggested locations for the overlay and receives a selection of a suggested location. The overlay is placed in the selected location. A system includes memory with instructions for inserting an overlay into video content. The system receives an indication of an overlay to be placed in the video, performs attention modeling on the video to identify zones likely to be of interest to a viewer. The system presents locations within the identified zones where the overlay can be inserted and receives a selection of a location. The system inserts the overlay into the selected location and renders the video with the inserted overlay.

21 Claims, 12 Drawing Sheets

(56) References Cited

U.S. PATENT DOCUMENTS

| | | | |
|---|---|---|---|
| 2010/0104256 A1* | 4/2010 | Tsurumi | 386/69 |
| 2010/0259595 A1* | 10/2010 | Trimeche et al. | 348/43 |
| 2011/0078746 A1* | 3/2011 | Chung | 725/61 |
| 2011/0314380 A1 | 12/2011 | Pritchett | |
| 2011/0321084 A1* | 12/2011 | Takahashi et al. | 725/32 |
| 2013/0101210 A1* | 4/2013 | Tang | H04N 1/3873 382/165 |

OTHER PUBLICATIONS

Digital Video Ad Serving Template (VAST), IAB, http://www.iab.net/media/file/VAST-2_0-FINAL.pdf, Nov. 2009, 16 pages.

Digital Video In-Stream Ad Format Guidelines and Best Practices, Interactive Advertising Bureau, http://www.iab.net/media/file/IAB-Video-Ad-Format-Standards.pdf, 2008, 16 pages.

Digital Video In-Stream Ad Metrics Definitions, IAB, Stream Metrics Definitions.pdf, Jun. 2008, 8 pages.

Unobtrusive ads can boost revenue, Inside AdSense Blog, http://adsense.blogspotro/2006/05/unobtrusive-ads-can-boost-revenue.html, May 8, 2006, 3 pages.

US Online Advertising Spending to Surpass Print in 2012, http://www.emarketercom/Article/US-Online-Advertising-Spending-Surpass-Print-2012/1008783, Jan. 19, 2012, 3 pages.

Video Player-Ad Interface Definition (VPAID), IAB, http://www.iab.net/media/file/VPAIDFINAL51109.pdf, Apr. 2009, 29 pages.

Video retrieval and summarization, Elsevier Inc., doi:10.1016/j.cviu.2003.08.003, 2003, 6 pages.

Baccot et al., On the Impact of Sequence and Time in Rich Media Advertising, MM'09, ACM 978-1-60558-608-3/09/10, Oct. 19-24, 2009, pp. 849-852.

Baluja et al., Video Suggestion and Discovery for YouTube: Taking Random Walks Through the View Graph, WWW 2008, ACM 978-1-60558-085-2/08/04, Apr. 21-25, 2008, pp. 895-904.

Beales, the Value of Behavioral Targeting, Network Advertising Initiative, http://www.networkadvertising.org/index.asp, 25 pages.

Chen et al., A visual attention model for adapting images on small displays, Multimedia Systems, (DOI) 10.1007/s00530-003-0105-4, 2003, 12 pages.

Chen et al., Visual Contextual Advertising: Bringing Textual Advertisements to Images, Association for the Advancement of Artificial Intelligence (www.aaai.org), 2010, 6 pages.

Dembczynski et al., Predicting Ads' ClickThrough Rate with Decision Rules, WWW 2008, Apr. 21-25, 2008, 8 pages.

Ell et al., Hypercomplex Fourier Transforms of Color Images, IEEE Transactions on Image Processing, vol. 16, No. 1, Jan. 1, 2007, pp. 22-35.

Feng et al., A Novel Region-Based Image Retrieval Algorithm Using Selective Visual Attention Modell, ACIVS 2005, LNCS 3708, 2005, pp. 235-242.

Guo et al., AdOn: An Intelligent Overlay Video Advertising System, SIGIR, ACM 978-1-60558-483-6/09/07, Jul. 19-23, 2009, pp. 628-629.

Huberman et al., the Economics of Attention: Maximizing User Value in Information-Rich Environments, ADKDD, ACM 978-1-59593-833-6/07/0008, Aug. 12, 2007, pp. 16-20.

Itti et al., A Comparison of Feature Combination Strategies for Saliency-Based Visual Attention Systems, California Institute of Technology, 10 pages.

Itti et al., A Model of Saliency-Based Visual Attention for Rapid Scene Analysis, IEEE Transactions on Pattern Analysis and Machine Intelligence, vol. 20, No. 11, Nov. 1998, pp. 1254-1259.

Itti et al., Principled Approach to Detecting Surprising Events in Video, IEEE, Jun. 2005, 7 pages.

Judd et al., Learning to Predict Where Humans Look, MIT Computer Science Artificial Intelligence Laboratory and MIT Brain and Cognitive Sciences, 8 pages.

Li et al., Measuring the Intrusiveness of Advertisements: Scale Development and Validation, Journal of Advertising, vol. 31, No. 2, 2002, pp. 37-47.

Liao et al., "AdImage: Video Advertising by Image Matching and Ad Scheduling Optimization", SIGIR, ACM 978-1-60558-164-4/08/07, Jul. 20-24, 2008, pp. 767-768.

Lin et al., Segmentation of Lecture Videos Based on Text: A Method Combining Multiple Linguistic Features, Proceedings of the 37th Hawaii International Conference on System Sciences, IEEE, 2004, 9 pages.

Longfei et al., A Computable Visual Attention Model for Video Skimming, IEEE DOI 10.1109/ISM.2008.117, pp. 667-672.

Ma et al., A User Attention Model for Video Summarization, ACM 1-58113-620-X/02/0012, Dec. 1-6, 2002, pp. 533-542.

Mei et al., Contextual In-Image Advertising, MM, ACM 978-1-60558-303-7/08/10, Oct. 26-31, 2008, pp. 439-448.

Miller, WordNet: A Lexical Database for English, Communications of the ACM, 1995, pp. 39-41.

Pickering et al., ANSES: Summarisation of News Video, CIVR, LNCS 2728, 2003, pp. 425-434.

Guo et al., Spatio-temporal Saliency detection using phase spectrum of quaternion fourier transform, In Proceedings of CVPR'2008, IEEE, 2008, 8 pages.

Resnik, Using Information Content to Evaluate Semantic Similarity in a Taxonomy, Proceedings of IJCAI-95., Nov. 29, 1995, 6 pages.

Rosenholtz et al., An Intuitive Model of Perceptual Grouping HCI Design, CHI 2009, ACM, Apr. 3-9, 2009, 10 pages.

Wang et al., Advertising Based on Users' Photos, 4 pages.

Wang et al., Media Strategy vs. Content Strategy in Online Advertising: Exploring the Influence of Consumers' Goal-Directedness for Web Navigation, 11th Pacific-Asia Conference on Information Systems, 12 pages.

Wang et al., The effects of attention inertia on advertisements on the WWW, Computers in Human Behavior, vol. 23, www.sciencedirect.com, 2007, pp. 1390-1407.

Wolf et al., Image Saliency Mapping and Ranking Using an Extensible Visual Attention Model Based on MPEG-7 Feature Descriptors, The Information Science Discussion Paper Series, No. 2005/10, ISSN 1172-6024, Dec. 2005, 21 pages.

Yih et al., Finding Advertising Keywords on Web Pages, WWW, ACM 1595933239/6/0005, May 23-26, 2006, pp. 213-222.

Yoo et al., Assessing the Effects of Animation in Online Banner Advertising: Hierarchy of Effects Model, Journal of Interactive Advertising, vol. 4 No. 2, 2004, pp. 49-60.

Wong et al., "Practical Perceptually Adaptive Approach to Video Logo Placement in TV Broadcasts", Electrical and Computer Engineering, 2007, Canadian Coference on Apr. 1, 2007, pp. 796-799.

Combined Search and Examination Report for United kingdom Patent Application No. GB1409580.6 mailed Nov. 27, 2014.

* cited by examiner

PLACING UNOBTRUSIVE OVERLAYS IN VIDEO CONTENT

TECHNICAL FIELD

This disclosure relates generally to computer-implemented methods and systems for placing overlays in video content and more particularly relates to placing overlays in unobtrusive locations in video content.

BACKGROUND

Video content can be distributed from a provider as video on demand (VOD), time-shifted television, live television, media such as a digital video disc (DVD), motion pictures distributed to theaters as digital video signals, and as electronic content distributed to computing devices. Video content can be broadcast over the air as digital signals, transmitted via satellite, and streamed, downloaded, and uploaded via communications networks such as the Internet.

Given the broad distribution of such video content and growing proliferation of viewing and playback devices for viewing such video content, providers and distributors of video content often employ video-advertising techniques to insert advertisements into video content.

Prior solutions for inserting advertisements into video content include placing linear advertisements into the video content. Linear advertisements are inserted manually or at predetermined points or times within video content. Linear advertisements capture the entire screen the video content is being viewed on and stop or interrupt playback of the video content while the advertisements are playing. Linear advertisements may be inserted as pre-rolls to be played before the video content begins playing, as mid-rolls, which requires the video content to be paused at some point in order to play the advertisements, or as post-rolls played after the video content. Linear advertisements are obtrusive in that they capture the entire screen being used to view video content and interrupt the video content being played.

Another prior solution includes placing non-linear advertisements into video content such that the video content is played while simultaneously showing the non-linear advertisements. Although non-linear advertisements are typically less obtrusive than linear advertisements, their reliance on predetermined screen locations still results in obtrusive placements by covering important elements of a video scene being viewed. For example, by placing non-linear advertisements in predetermined or predefined locations at the bottom or top of a screen, important elements of news or sports video content such as captions, scrolling text with headlines, scores, weather and time information, statistics, stock tickers, and other important objects may be obscured or rendered illegible. Non-linear advertisements comprise images, such as logos and icons and textual data appearing in a predefined portion of a visible frame of video content. Current non-linear advertisement placement techniques can also result in incompatible color combinations with respect to adjacent colors in frames of video content the non-linear advertisements are placed in. For example, current techniques can result in illegible and/or garish advertisements due to color combinations that are incompatible with or in stark contrast to adjacent video content.

These prior solutions do not provide automated matching of ovelays with video content based on properties of the video content and the overlay. Traditional advertisement placement techniques do not allow automated determination of unobtrusive locations for placing advertisements based on identification of important objects within video content. These techniques also lack a way for automatic or interactive selection of an advertisement location from amongst alternative unobtrusive locations based on relative saliency of alternative locations.

SUMMARY

In one embodiment, a method includes receiving, at a computing device, video content and an indication of an overlay to be placed in the video content. The overlay can be an item of electronic content such as text, image, and multimedia content. Based at least in part on properties of the overlay and properties of the video content, the method determines locations where the overlay can be placed within the video content. The embodiment involves presenting the plurality of locations in a user interface on a display of the computing device as suggested locations for the overlay. The method receives a selection of one of the suggested locations and places the overlay in the selected location.

In another embodiment, a system has an input device, a display device, a processor, and a memory. The memory has instructions stored thereon that, if executed by the processor, cause the processor to perform operations for inserting an overlay into video content. The operations include receiving an indication of an overlay to be placed in the video content. The system performs attention modeling on frames of the video content to identify zones in the video content likely to be of interest to a viewer of the video content. The system presents a user interface on the display device. The user interface indicates locations within the identified zones where the overlay can be inserted into. The system receives, via the input device, a selection of a location within one of the identified zones. The system inserts the overlay into the selected location and renders the video content with the inserted overlay on the display device.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1A:
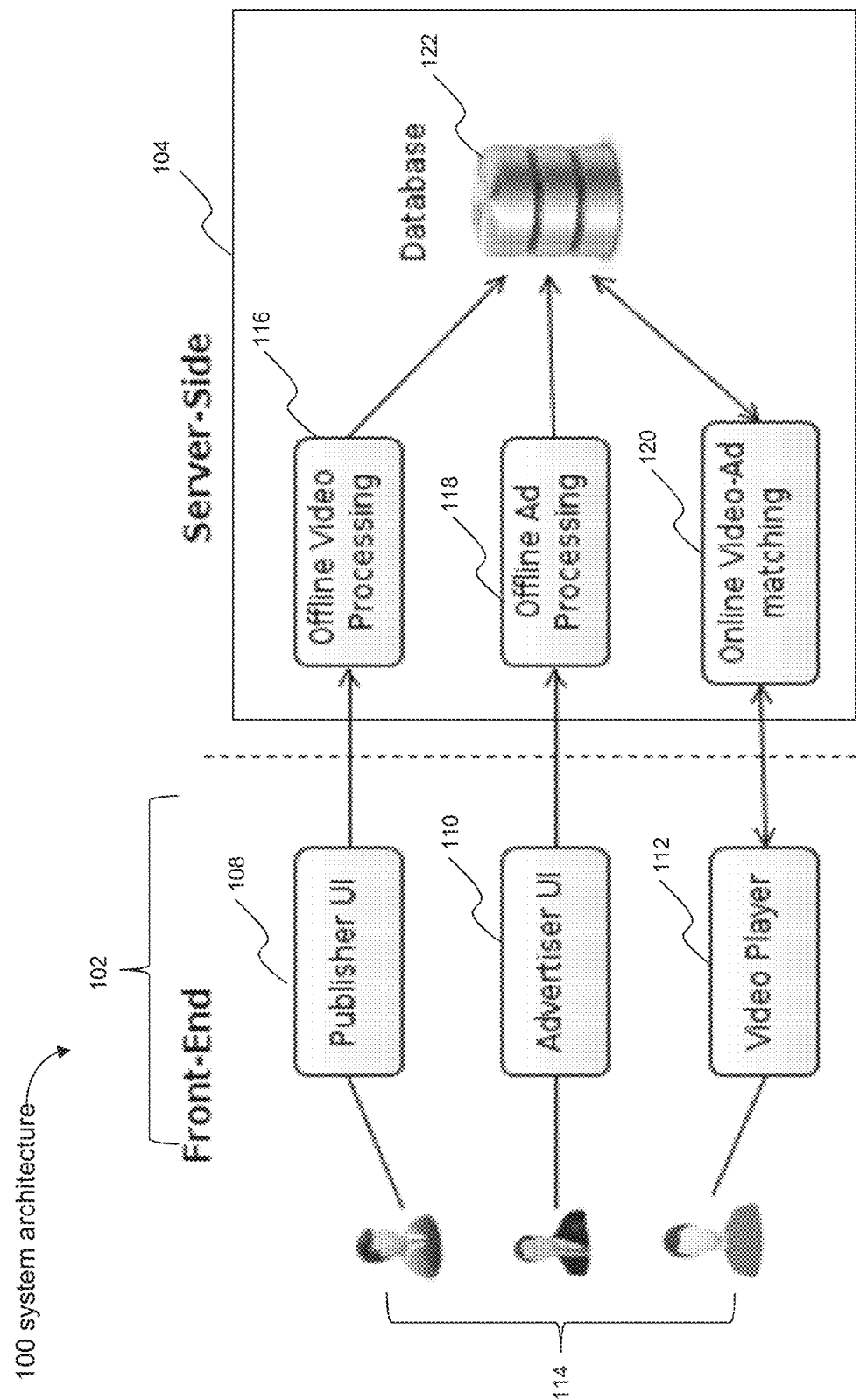
FIG. 1A is a block diagram depicting a system architecture for an overlay placement system, in accordance with embodiments.

Methods and systems are disclosed for placing overlays in unobtrusive locations within video content.

Embodiments disclosed herein provide automated and semi-automated methods and systems for inserting overlays, such as, but not limited to, advertisements, into multimedia assets such as video content. Although exemplary computer-implemented methods and systems are described herein in the context of overlays placed in online video content, it is to be understood that the systems and methods can be applied to place overlays within other multimedia assets, such as, but not limited to, video on demand (VOD) assets (i.e., pay-per-view movies and rental assets), subscription video on demand (SVOD) assets, currently-airing or future-scheduled linear broadcast television programs, simultaneous broadcasts (simulcasts), movies shown in theaters, physical media such as digital video discs (DVDs), and software programs such as video games.

One embodiment provides a system that automates placement of unobtrusive overlays into video content. The video content can be online video content obtained from content providers, publishers and distributors. Such online video content can be streaming or downloaded video requested from a website by a video player application executing on a client device. The request from the client device is received at a server associated with a provider's or publisher's web site. Overlays are placed in the requested video content based in part on properties of the video content and properties of overlays available from overlay providers such as advertisers.

Embodiments provide a method and system for inserting overlays into received video content, the overlays having been provided by an external entity. The external entity can be an advertising network or other overlay provider. The method and system can receive indications of the overlays via a user interface and overlay processing module. The method and system can be implemented using a video-overlay matching module configured to be invoked by or integrated into video editing tools, such as, but not limited to, Adobe® Premiere®, Final Cut Pro from Apple, Inc., and iMovie from Apple, Inc. The method and system determine non-obtrusive locations within the video that the provided overlays can be placed in. Non-obtrusiveness can be based on properties of the overlays and properties of frames of the video content. Depending on the duration of an overlay, it can appear in frames spanning multiple clips or scenes of the video content. Locations are determined to be non-obtrusive if an overlay having certain size, dimension, color, and/or translucency properties will not obscure or overlap with important objects in the frames. In embodiments, relative saliency of regions within frames of the video content is determined by identifying important objects in the frames. One embodiment determines saliency of regions by performing saliency analysis for frames of the video to identify important objects. The saliency analysis produces a saliency map indicating locations of important objects within frames and regions in the frames containing such objects. An exemplary saliency analysis technique is described below with reference to FIG. 7. In certain embodiments, non-obtrusive locations are locations within regions that do not include an important object. The non-obtrusive locations are presented as suggested locations in an interactive user interface (UI).

The UI can present budget or cost information for placing a given overlay in each of the suggested locations. Costs can be expressed in terms of relative importance, or salience, of the suggested locations, i.e., salience costs. Costs can also be expressed in terms of monetary or currency amounts. In embodiments, a monetary cost for placing an overlay in a given location can be based at least in part on the salience cost for that location. The cost information can be based in part on the size and duration properties of the overlay as well as properties of the suggested locations within the frames. For example, monetary costs of placing longer-duration and larger-sized overlays may be greater than placing relatively shorter-duration or smaller-sized overlays in the same location. Also, for example, the salience cost of placing a given overlay in closer proximity to important objects in the frames may cost more than placing the same overlay farther away from important objects. Further, for example, the salience costs of placing a given overlay in frames making up more important portions of the video content may be greater that the costs of placing the same overlay in less-important portions of the video content. In cases where an overlay can be placed in a relatively highly salient region without overlapping an important object, the salience cost of placing the overlay in the high salience region will be greater than the salience cost of placing the same overlay in a less salient region. Relative importance of portions of the video content can be identified based on properties of frames of the video content. For example, locations in frames within early portions, opening credits, key scenes, and/or prior to scene changes and cut points in the video content may have higher salience and/or monetary costs than other locations such as closing/end credits, and frames following scene changes and cut points. The UI can receive, via an input device, a selection of one of the suggested locations. The method and system allow a user to preview the video content with overlays inserted into selected locations, and optionally select an alternative location.

Another embodiment provides a system configured to automatically transform an inserted overlay so that it blends into the frames that it appears in. The system can automate transformation of inserted overlays so that edges of the overlay are reshaped, recolored, made translucent, made transparent, or otherwise transformed in order to better blend in with adjacent pixels in frames of video content the overlay appear in. For example, the frames can be scanned to detect substantially straight lines of an object near the overlay and edges of the overlay near the object can be reshaped or distorted to become substantially parallel with the lines. In certain embodiments, such reshaping is done to transform one or more edges of an inserted overlay to be substantially parallel with an object near the overlay that has relatively low salience. The system can also transform inserted overlays so that their color scheme and palette blends into the frames in which the overlay appears.

Yet another embodiment provides a method for automatic placement of overlays into three-dimensional (3D) video content. The method determines a favorable location for an overlay within the video content, where favorability can be based on identified locations of important objects in the 3D video and shape, dimension and size properties of the overlay. Favorable locations are locations the overlay can be inserted into such that it will not overlap with important objects. In general, favorable locations are in regions with relatively low saliency. Saliency can be determined by performing saliency analysis of frames of the video content in a similar manner as is done with two-dimensional (2D) video content where locations of important objects along a longitudinal x axis and latitudinal y axis within frames of the video content are determined. In the context of 3D video content, additional computations are performed to determine the depth locations of the important objects (i.e., their locations along the z axis in 3D space) and their depth properties (i.e., thicknesses in pixels). The method then transforms the overlay into a 3D overlay by assigning a depth property to the overlay. In one embodiment, the overlay is initially assigned an infinite depth so that no location in the forefront of a frame will be suggested that can occlude an important object appearing deeper within the 3D video content. In certain embodiments, the 3D overlay can be blended into nearby objects by assigning a depth to the overlay that approximates a depth of one or more nearby 3D objects.

In certain embodiments, the overlays can be selected from a plurality of overlay advertisements provided by one or more advertisement networks. In one embodiment, an advertisement network can comprise three general categories of entities: 1) content providers, distributors, and other entities who create and offer video content (collectively "publishers"); 2) overlay providers, advertisers, and other entities who are the source of overlays (collectively, "advertisers"); and 3) viewers, subscribers, consumers, theaters, and other entities who request, receive, and/or watch video content offered by publishers (collectively, "viewers").

One embodiment provides an administrator user interface (UI) that publishers and advertisers can use to upload video content, overlays, and associated metadata into the system. In certain embodiments, references to the video content are provided via the administrator UI instead of full copies of the content. As used herein, the term "metadata" is used to refer to information associated with (and generally but not necessarily stored with) electronic content items such as video content and overlays that provides information about a property of the electronic content item. Metadata may include information uniquely identifying an electronic content item. Such metadata may describe a storage location or other unique identification of the electronic content item. For example, metadata describing a storage location of video content may include a reference to a storage location of a copy of the video content in a server system used by publishers, advertisers, and users. One example of such a reference is a Uniform Resource Locator (URL) identifying the storage location on a web server associated with a publisher's web site. Such references can be provided by publishers as an alternative to uploading a copy of the video content to the system via the administrator UI. An exemplary administrator UI 300 is described below with reference to FIG. 3.

An embodiment of the system includes a repository, such as a data store or database, for storing the uploaded overlays, the video content (or references thereto), and their metadata. An example database 122 is described below with reference to FIGS. 1A and 1B. The metadata can include characteristics and properties of video content and overlays. The video content properties can include, but are not limited to, genre/category, rating, duration, color palette/scheme, resolution, format, language options, captioning options, publisher, cast, director, date/timestamp information, playback restrictions, markers for linear advertisements, compatible/supported rendering/viewing platforms, and other properties of video content. Some video content properties, such as a genre or publisher, can apply to an entire video asset, while other properties are relevant to certain portions or frames of the video asset. For example, metadata useful for editing or placing overlays in video content such as cut points, scene changes, opening credits, closing/end credits, and similar information, does not apply to every frame in a given video asset. Similarly, format properties can indicate whether all or a portion of a video asset is 2D or 3D. Playback restriction properties can include regional or age-based restrictions as well as restrictions on a number of viewings or a time limit for viewing (i.e., for VOD and rented video content). For a rented video asset, a playback restriction property can indicate the length of a video asset rental as a duration (i.e., 24 hours). The compatible/supported rendering/viewing platform properties can indicate minimum requirements for viewing the video content, such as supported resolutions, compatible video players, and supported client device platforms. For example, these properties can indicate a minimum display resolution, display size, operating system (OS) version, and/or browser version needed to view the video content.

Some or all of the video content properties can be in the form metadata included as tags/keywords, data carrying icons, or markers stored within the video content. For example, the metadata can be included outside of visible areas of frames of the video content. Non-limiting examples of metadata for electronic content items can include a title, author, keywords, and the like. Metadata may also describe a relationship between video content and overlays, such as how the video content and the overlays can be combined to create edited video content including the overlays. Metadata can also describe when and how an electronic content item was created, such as information identifying application used to create the item, a timestamp, a file type, encryption status, and other technical information for the item, and/or access rights for the item. In certain embodiments, the metadata can include rendering attributes and their values for video content or an overlay. For example, if a rendering attribute is included in metadata for video content, the metadata can also include a value for that rendering attribute specific to rendering the content via a video player application that the content is to be viewed with. Depending on the encryption status and/or access rights, video content may be transmitted to/from the publisher via secure network connections or data links. Non-limiting examples of such secure connections include connections made using the Secure Sockets Layer (SSL) protocol or the Transport Layer Security (TLS) protocol. As would be understood by those skilled in the relevant art(s), SSL and TLS connections are made via cryptographic protocols to provide communication security over data networks such as the Internet. In additional or alternative embodiments, properties can be stored separately from the video content in a repository such as database 122, which is described below with reference to FIGS. 1A and 1B.

The overlay properties can include, but are not limited to, product/service category, duration, target demographic, target region, color palette/scheme, translucency, shape, format, size, dimensions, resolution, language options, date/timestamp information, monetary cost per placement, number of prior insertions/placements, budget, expiration, and other metadata about the overlay. The format properties can indicate whether the video content and the overlay is 2D or 3D. In cases where the format of overlay is 3D, the dimension property includes a depth of the overlay. The size and dimension properties can be in terms of pixels. In cases where an overlay is an advertisement, a number of placements can be expressed as a number of times the advertisement has been inserted in video content and this property, in combination with the monetary cost per placement and/or budget properties, can be used to determine if there is any remaining budget for inserting the advertisement into video content. The expiration property can be embodied as an expiration date in order to determine if an overlay is still available for insertion into video content. For example, if an overlay includes time-sensitive information, such as information pertaining to a scheduled event, such as, but not limited to, a sale occurring within a date/time range, a time-sensitive promotion, a product release date, a television program debut, a theatrical movie release, or a temporary offer, the expiration property can be set accordingly so that the overlay is not inserted into video content after a certain date or time.

According to an embodiment, when a user requests video content offered by a publisher who is a member of the advertisement network, a rendition of the requested content with overlay advertisements from an advertiser in the network is delivered to the user. The user can request the video content via a smart TV, a set top box (STB), or a video player application, such as the exemplary video player 112 described below with reference to FIG. 1. In one embodiment, the user can request and view video content in the video player 112 executing on a client device having a display. The video player 112 can have a video player UI that users can interact with to select, preview, and view video content. The selected video content can be downloaded or streamed to a client device where video player 112 is executing. An exemplary video player UI 400 is described below with reference to FIG. 4. For example, in the context of online video content, when a user requests video during a visit to a publisher's web site, that user will receive some advertisements. Each of the entities benefits from this process as described below.

The overlay provider (i.e., an advertiser, organization, or other entity wishing to convey information via an overlay) can publicize and promote items indicated in overlays. For example, in embodiments where the overlay provider is an advertiser, the advertiser can increase awareness of a service, product or brand offered for sale. As would be understood by those skilled in the relevant art(s), this increased awareness can correspond to increased sales of the service, product, or branded items indicated in the overlay advertisement. In embodiments, overlay providers can be video content providers, such as, but not limited to, television networks, web sites, and movie/film studios, who wish to place overlay advertisements promoting their television programs, online video content, and films.

The video content provider (i.e., a distributor, publisher, or web-site) can receive revenue from the overlay provider for displaying the overlay provider's overlay in video content offered by the video content provider. In turn, this revenue stream can allow video content providers to offer consumers, such as subscribers, and viewers of the video content additional services. These additional services can include more video content, reduced-price (or free content), and/or content with increased quality. Where the video content is provided online as electronic content, increased quality can be embodied as a higher resolution rendition of the video content and/or a rendition of the video content without linear advertisements. In embodiments, the revenue stream from overlays enables video content providers to reduce prices for video content. For example, reduced-price or free renditions of iTunes videos, iTunes apps and games containing video content, pay-per-view video assets such as movies and television programs, Amazon Video On Demand assets, and VOD video content can be offered to consumers. An embodiment avoids placement of poorly targeted overlays having little relevance to a group of consumers viewing video content. Another embodiment avoids placing obtrusive or intrusive overlays which may cause a viewer to ignore the overlays or even choose competitor web-sites that offer the services they need. Furthermore, this kind of overlay can have a negative impact in the way the advertiser is perceived.

Embodiments can thus address issues related to one or both of overlay matching (finding the most suitable overlay for video content) and unobtrusive overlay insertion. Besides these issues, there are other important aspects that can be addressed in online advertising, e.g., deciding what sum an overlay provider or advertiser will pay for a selection (i.e., a click) on an interactive overlay or advertisement. This can be addressed through a bidding process (e.g., bidding on objects to be placed in video content) and/or by using overlay properties pertaining to budget and monetary cost per placement.

As used herein, the term "video content" refers to any type of audiovisual media that can be displayed or played on television devices, projection television systems, digital video recorder (DVR) devices, DVD devices, game consoles, computer-implemented video playback devices, mobile multimedia devices, mobile gaming devices, and set top box (STB) devices. A STB can be deployed at a user's household to provide the user with the ability to control delivery of video content distributed from a provider. Video content can be electronic content distributed to computing devices via communications networks such as, but not limited to, the Internet.

Edited video content including unobtrusive overlays placed by the exemplary systems and methods disclosed herein can be previewed, selected and viewed by various video player devices and platforms used to select and view video content. Such devices can be components of platforms including personal computers, smart phones, personal digital assistants (PDAs), tablet computers, laptops, digital video recorders (DVRs), remote-storage DVRs, interactive TV systems, and other systems capable of receiving and displaying video content and/or utilizing a network connection such as the Internet. An exemplary interactive TV system can include a television communicatively coupled to set top box (STB). With reference to FIG. 1B, exemplary STB client device 134b can include, without limitation, an Internet Protocol (IP)-based (i.e., IPTV) STB. References to a client device or video player should therefore be interpreted to include these devices and other similar systems involving display of video content and viewer input.

As used herein, the term "electronic content" refers to any type of media that can be rendered for display or played on mobile and other computing devices. Computing devices include client and server devices such as, but not limited to, servers, desktop computers, laptop computers, smart phones, video game consoles, smart televisions, tablet computers, portable gaming devices, personal digital assistants, etc. Electronic content can be streamed to, downloaded by, and/or uploaded from computing devices. Electronic content can include multimedia hosted on websites, such as web television, Internet television, standard web pages, or mobile web pages specifically formatted for display on computing devices. Electronic content can also include application software developed for computing devices that is designed to perform one or more specific tasks at the computing device.

Video content can be in the form of electronic content streamed from a server system to a web-enabled television (i.e., a smart television), a projection television system, or a client computing device. Streaming electronic content can include, for example, live and on-demand audiovisual content provided using a streaming protocol, such as, but not limited to, Internet Protocol television (IPTV), real time messaging protocol (RTMP), hypertext transfer protocol (HTTP) dynamic streaming (HDS), and HTTP Live Streaming (HLS). A server system can provide multiple renditions of video content having different quality levels and language options, such as captioning or audio dubbing.

Computer-implemented systems and methods are disclosed for placing overlays in unobtrusive locations within video content. In embodiments, overlays can include text or multimedia content, such as, but not limited to, advertisements. An interactive user interface (UI) for an application executed at a client device can be used to select from among suggested locations for overlay placement.

As used herein, the term "electronic content" is used to refer to any type of media that can be rendered for display or use at a computing system, television, client computing device, or other electronic device. Electronic content can include text or multimedia files, such as images, video, audio, or any combination thereof. Electronic content can be delivered as streaming video and as downloaded data in a variety of formats, such as, for example, a Moving Picture Experts Group (MPEG) format, an Audio Video Interleave (AVI) format, a QuickTime File Format (QTFF), a DVD format, an Advanced Authoring Format (AAF), a Material eXchange Format (MXF), and a Digital Picture Exchange (DPX) format. Electronic content can also include application software that is designed to perform one or more specific tasks at a computing system or computing device.

As used herein, the term "rendition" is used to refer to a copy of an asset, such as video content, provided to a video player or client device. Different renditions of electronic content can be encoded at different bit rates and/or bit sizes for use by client devices accessing electronic content over network connections with different bandwidths. When the electronic content includes video content, different renditions of the video content can include different overlays for viewing on client devices located in different regions. For example, a video asset can include multiple renditions of the video as separate video clips, where each rendition has a different quality level associated with different bit rates.

As used herein, the term "asset" is used to refer to an item of electronic content included in a multimedia object, such as text, images, videos, or audio files. As used herein, the term "image asset" is used to refer to a digital image included in a multimedia object. One example of an image asset is an overlay. As used herein, the term "video asset" is used to refer to a video file included in a multimedia object. Video content can comprise one or more video assets. As used herein, the term "text asset" is used to refer to text included in a multimedia object. Exemplary overlays can be embodied as a text asset, an image asset, a video asset, or a combination of text, image, and/or video assets. For example, overlays, such as overlays 406 and 506 depicted in FIGS. 4, 5A, and 5B, can include a text asset such as a name of a company, product, or service, combined with an image asset with a related icon or logo. Also, for example, overlays can include video assets with animation or a video clip.

For simplicity, the terms "multimedia asset," "video asset," "online video content," and "video content" are herein to refer to the respective assets or contents regardless of their source (i.e., publisher), distribution means (i.e., web site, broadcast, simulcast or theatrical release), format (i.e., MPEG, high definition, 2D, 3D), or playback means (i.e., television, client computing device, video player, projection system, DVD player) used to view such files and media. For example, where the publisher of a video asset is a television network, movie/film studio, or production company, the video asset can be a television program or motion picture. Renditions of this video asset can be embodied as streaming or downloadable online video content available from a web site of the publishers or a distributor's web site. Another rendition of the video asset can also be made available as video content on media such as a DVD, a DVR recording, or VOD obtained via an STB and viewed on a television.

Embodiments can provide a viewer application with different renditions of electronic content being rendered for display or use at a client device based in part on a geographic region or location the client device is associated with. Dynamically switching between different versions of video content can provide the most-relevant rendition based on overlays placed within the video content and a region or location of the client device accessing the electronic content via a data network. A viewer application can download, stream, or otherwise access electronic content via a network. The viewer application can submit a request to preview of view video content to a server having a server-side video-overlay matching system or module. The video-overlay matching system can create a rendition of the requested video content having non-obtrusively placed overlays determined to be relevant to a location or region associated with the client device the viewer application is executing on. For example, an embodiment can select a rendition of electronic content with overlays having audio and/or text in English in response to determining that a client device the viewer application is executing on is located in the United States. In embodiments, such location information and/or language preferences can be user-selected. In other embodiments, the location information can be determined automatically based on a Global Positioning System (GPS) location of the client device, a media access control address (MAC address) of the client device, a network address of the client device, or other identifying information.

The video-overlay matching system can be implemented as one or more modules configured to execute on a server or other computing device. The video-overlay matching system can apply one or more placement rules to generate recommendations for suggested overlay locations. A recommendation can include one or more suggested overlay locations and indicate respective salience and/or monetary costs for each of the suggested locations. The recommended locations for a rendition of video content to be downloaded or otherwise accessed by the viewer application can be based in part on properties of the video content and the overlay. The cost information can be based on the size, prominence, and duration of the overlay to be placed in the video content. The cost information can vary based on differing quality of renditions available from a video content provider.

The video-overlay matching system can determine location recommendations based on properties of the overlay and frames of the video content the overlay is to be placed in. For example, color scheme and color palette properties of an overlay and region within video content frames can be used to identify locations within the regions whose colors are compatible with a given overlay. Such color properties can also be used to transform an overlay so that its edges include colors and hues that blend into surrounding pixels in a location where the overlay is to be placed. The video-overlay matching system can also configure the viewer application to select a rendition having overlays deemed to be relevant to a region or physical location of a client device the viewer application is executing on. For example, overlay advertisements for tobacco or alcohol products will not be deemed relevant to countries or locations where such advertising is restricted.

As used herein, the term "network connection" refers to a communication channel of a data network. A communication channel can allow at least two computing systems to communicate data to one another. A communication channel can include an operating system of a first computing system using a first port or other software construct as a first endpoint and an operating system of a second computing system using a second port or other software construct as a second endpoint. Applications hosted on a computing system can access data addressed to the port. For example, the operating system of a first computing system can address packetized data to a specific port on a second computing system by including a port number identifying the destination port in the header of each data packet transmitted to the second computing system. When the second computing system receives the addressed data packets, the operating system of the second computing system can route the data packets to the port that is the endpoint for the socket connection. An application can access data packets addressed to the port.

Another embodiment of a video-overlay matching criterion can be a video content utilization rule. The video-overlay matcher can apply the video content utilization rule to generate a recommendation based on how the video content is being rendered for display in a video player at the client device. In one embodiment, the video content utilization rule can describe a size of a window in which video content is being rendered for display, where the described window size is relative to the size of the display device or screen associated with a client device where the video player is executing. For example, applying a video content utilization rule may generate a higher recommendation for a viewer application rendering video content for full-screen display at a client device. A lower recommendation for a full-screen display may produce pixeling/pixilation of the video content and included overlays. To this end, a lower recommendation on larger displays and a higher recommendation on smaller displays may be as detrimental to user experience as having insufficient screen size for an overlay to be legible on a display of the client device. In another embodiment, the video content utilization rule can describe a type of display device for which the client device renders the electronic content. Electronic content rendered for display or use at a first display device included in or in communication with the client device can result in a first recommendation. Video content rendered for display or use at a second display device included in or in communication with the client device can result in a second recommendation. For example, a lower recommended bit rate can be generated for video content being rendered for display or use by a client device using a low resolution screen, such as the screen of a tablet computer, and a higher recommended bit rate can be generated for electronic content being rendered for display or use by the client device using a high resolution display device, such as a high-definition television coupled to the tablet computer via a high-definition multimedia interface (HDMI) output.

The video-overlay matching system can store overlay data in a database and organize the overlay data based on a number of placements for each overlay, category, duration, remaining budget, and/or remaining number of placements.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Exemplary System Implementation

Figure 1B:
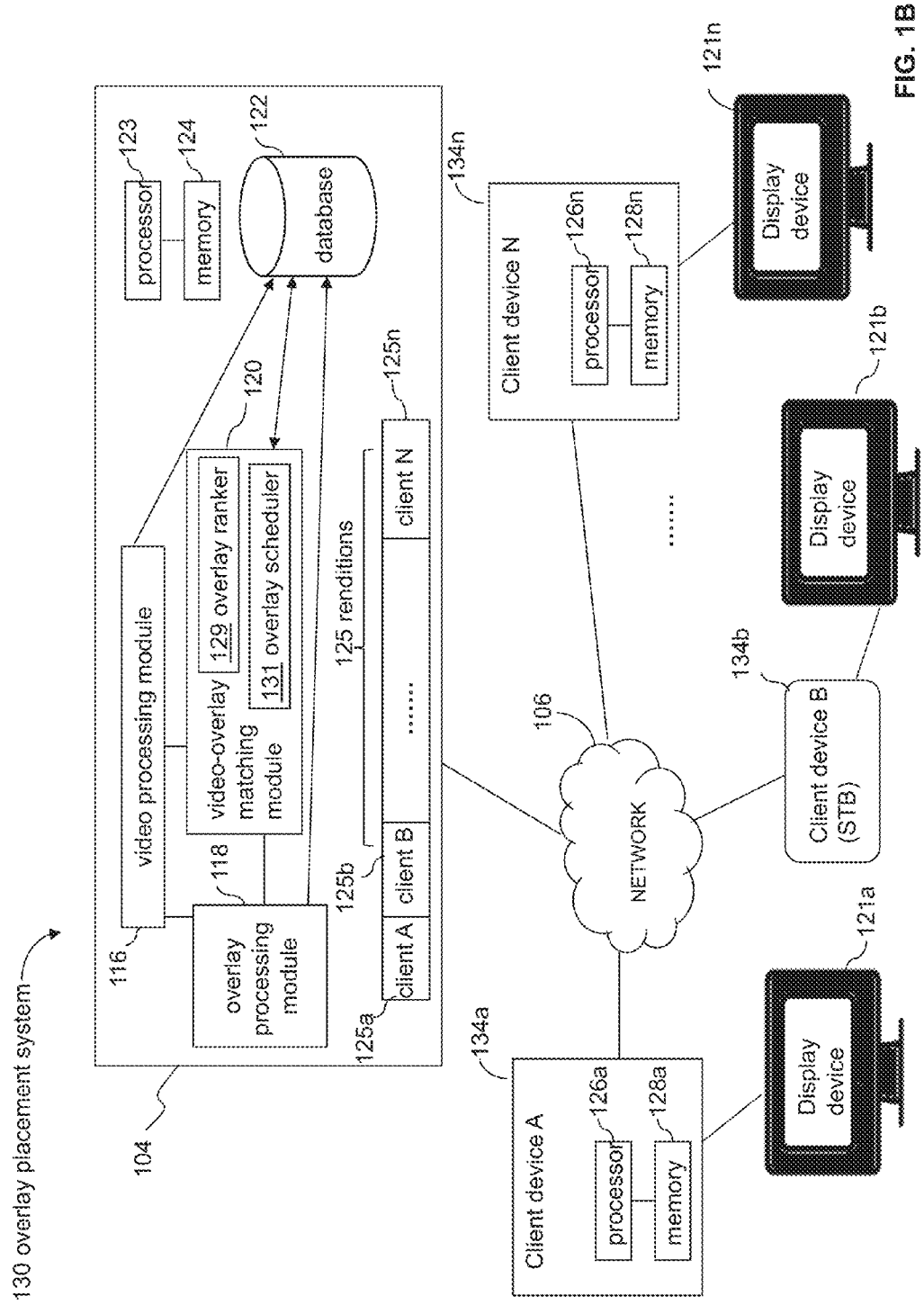
FIG. 1B is a block diagram depicting components of the overlay placement system illustrated in FIG. 1A, in accordance with embodiments.

Referring now to the drawings, FIG. 1A is a block diagram depicting an example architecture for an overlay placement system implementing certain embodiments. The example architecture 100 includes a server 104 configured to perform server-side processing in response to inputs and data received via a front end 102 comprising a publisher UI 108, an advertiser UI 110, and a video player 112. As shown in FIG. 1A, server 104 includes three main modules, one corresponding to each type of user 114. The server 104 modules include a video processing module 116, an overlay processing module 118, and a video-overlay matching module 120. Although exemplary modules 116, 118 and 120 shown in FIG. 1A are labeled for offline video and advertisement ('ad') processing and online video-advertisement matching, as discussed below and shown in FIG. 1B, these modules are not limited to offline video and advertisement processing and online video-advertisement matching. Embodiments of the modules shown in FIGS. 1A and 1B can be configured to process any type of overlay, including, but not limited to advertisements, to any type of video content, including, but not limited to, online video.

In one embodiment, server 104 is an overlay server providing a platform where publisher users 114 upload video content such as their video assets, advertiser users 114 upload overlays such as advertisements, and viewer users 114 (i.e., end-users or 'consumers' of video content who view video assets) are shown renditions of video content in video player 112 with (non-obtrusive) overlays inserted. According to this embodiment, video processing module 116 extracts information about video content 'offline' after a publisher user 114 uploads the video content via the publisher UI 108. Such offline video processing includes computing a saliency map and auxiliary matrix for the uploaded video content. For each overlay, overlay processing module 118 extracts information about the overlay 'offline' after an advertiser user 114 uploads it via the advertiser UI 110. A non-limiting example of the extracted information includes the color palette/scheme of the overlay. In this embodiment, video-overlay matching module 120 automatically handles overlay selection and placement. In an alternative embodiment, overlay selection may be done externally on a remote system or server through a bidding process where an overlay provider or advertiser user 114 specifies how much he would pay to have his overlay shown in certain video content. According to this alternative embodiment, the bidding and overlay selection can be based at least in part on a profile of a viewer user 114 who selects the particular video content for viewing within video player 112.

Another embodiment described below with continued reference to architecture 100 and server 104 provides a platform for fully automated overlay placement for each overlay, along with overlay transformations, such as, for example spatial (i.e., reshaping), resizing, color, translucency, and/or transparency transformations being performed in near real-time so that the resulting rendition of selected video content is shown to a viewer user 114 in video player 112 with the automatically placed and transformed overlays. For example, one or more edges of an overlay can be transformed so that the edges include colors and hues that blend into surrounding pixels in a location where the overlay is to be placed. Also, for example, edges of an overlay can be transformed so that they blend into surrounding portions of a video frame by being made translucent or substantially transparent. Such translucency and transparency transformations can increase the degree or percentage of translucency/transparency for overlay portions based on how far away (in pixels) portions of the overlay are from the center of the overlay. In this way, an overlay can be increasingly transparent or translucent as the edges of the overlay are approached and substantially opaque around the center of the overlay. The video-overlay matching system can also configure the viewer application to select a rendition having overlays deemed relevant to a region or physical location of a client device the viewer application is executing on. For example, overlay advertisements for tobacco or alcohol products will not be deemed relevant to countries or locations where such advertising is restricted.

In yet another embodiment, a partially automated process implements overlay placement and transformation algorithms inside a video editing tool such as, for example, Adobe® Premiere®, Final Cut Pro from Apple, Inc., or iMovie from Apple, Inc. This embodiment generates multiple alternative overlay placements and presents these alternative locations in an interactive UI so that a user such as an advertiser user 114 can manually select the location he considers best, so that there is a combination of automatically-generated suggestions/recommendations of overlay locations combined with optional, manual supervision from a user when inserting overlays into video content.

The users 114 of the overlay placement system can include video content publishers, overlay providers (i.e., advertisers), and viewers. Once a publisher uploads video content via a publisher UI 108, the video content is received by server 104, and a video processing module 116 performs various computations in order to be able to quickly retrieve the video content and its properties when necessary. Publisher UI 108 can allow a publisher user 114 to add new video content, along with metadata, such as, but not limited to, a brief description, title, and tags/keywords for the uploaded video content. As described below with reference to FIG. 3, publisher UI 108 can be invoked from an administrator interface. The keywords inserted via publisher UI 108 can be used by video-overlay matching module 120 for selecting appropriate overlays. These keywords can also represent an essential element for which overlay providers such as advertisers may bid on when identifying video content that they want to place their overlays into.

Video processing module 116 can read metadata for the received video content that applies to the entire video in order to categorize the content. For example, genre, resolution, format, access-control, rating and duration properties of the received video content can be indexed and stored in a database 122 with a reference to the video content so that the videos having a certain category can be quickly retrieved from database 122 as needed. In embodiments, when video-overlay matching module 120 needs to match an overlay that is appropriate to a certain type of video segment, the video properties data stored in database 122 by video processing module 116 can be used to quickly locate clips within video content matching the desired criteria. For example, video-overlay matching module 120 can match overlays appropriate for a high definition 3D sports video clip having a duration of less than 5 minutes that is rated for viewing on a video player 112 in a certain region by a viewer in a given age group to video content meeting these criterion using overlay and video properties data stored in database 122. Video processing module 116 can also read and store more granular metadata for uploaded video content that does not apply to every segment, portion or frame of the video content. Such granular metadata can, for example, can pertain to properties useful for overlay placement and video editing such as indications of frames including cut points or scene changes.

With continued reference to FIG. 1A, an advertiser user 114 can interact with the advertiser UI 110 to upload an overlay to server 104. In an embodiment, advertiser UI 110 consists of a form that allows an advertiser user 114 to upload a new overlay, along with overlay properties, such as keywords representing the desired context or video content in which the overlay should appear. Overlays uploaded via advertiser UI 110 can be interactive in that they can include a selectable hyperlink with a target URL that a viewer can click on while playing video content including the overlay. For such interactive overlays, the overlay properties entered via advertiser UI 110 can include the target URL associated with a supplier of a product, brand, or service indicated in the interactive overlay. For example, a viewer, using an input device, can interact with a video player 112 to click on an interactive overlay in order to navigate to the target URL in a new browser tab, window or session. After an overlay has been added using advertiser UI 110, metadata with properties (i.e., features) of the uploaded overlay are extracted by the overlay processing module 118, which then stores the extracted overlay properties are stored in database 122.

Figure 4:
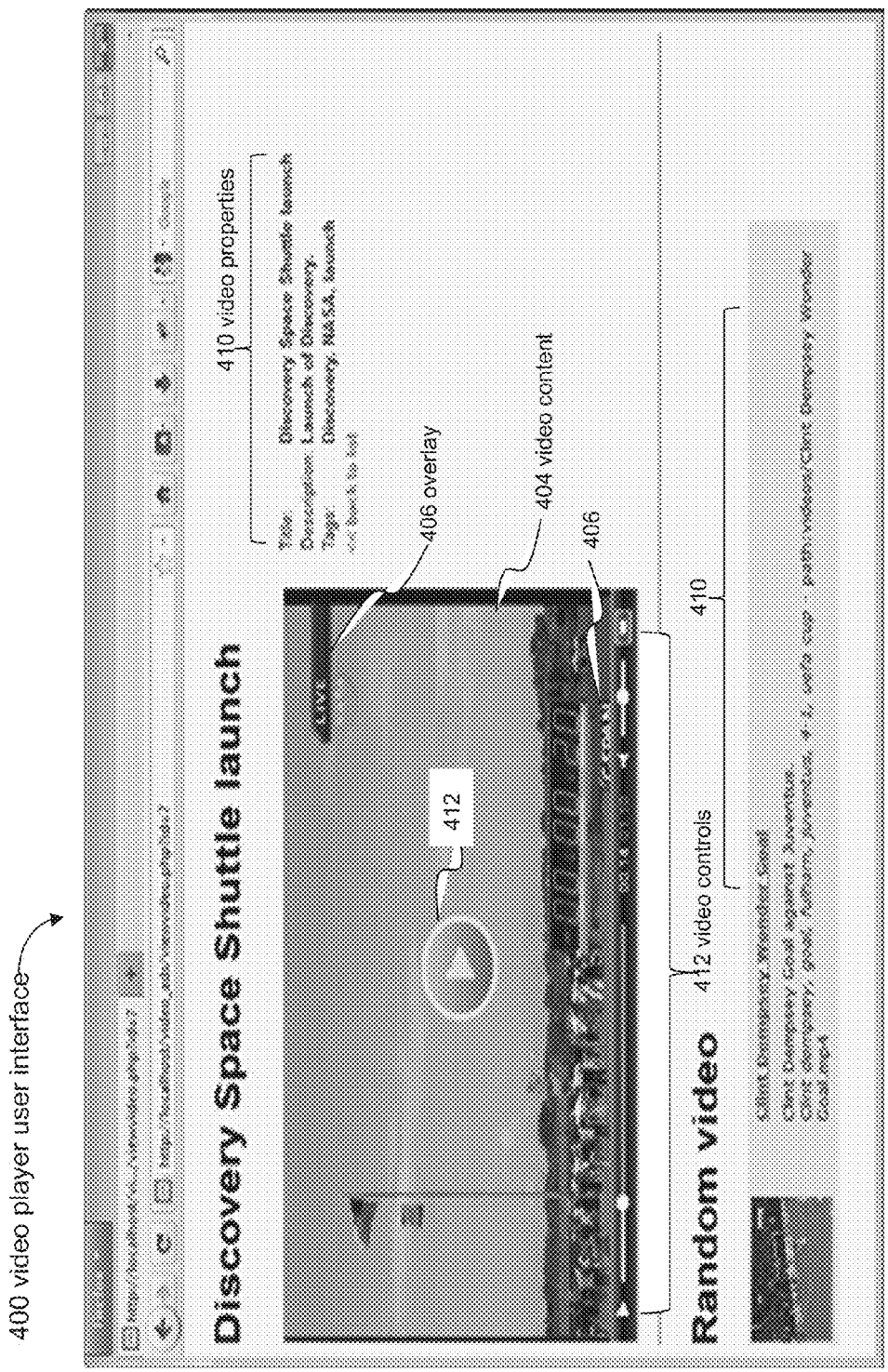
FIG. 4 illustrates an example user interface for a video player application, in accordance with embodiments.

A viewer user 114 can preview, select, and watch videos, along with the inserted overlays using the video player 112. In one embodiment, video player 112 is embodied as a video content web site that allows visitors to the web site to navigate, browse, and search a list of videos. Video player 112 allows a viewer user 114 to select video content from the list of videos and view the selected content. Delivery of the selected video content together with its inserted overlays can be accomplished via streaming, downloading, or pushing (i.e., podcasting) the content to video player 112. A non-limiting example of a browser-based UI for a video player 112 is illustrated in FIG. 4, which is described below. When a viewer user 114 requests video content to be viewed on video player 112, the video and overlay properties data previously stored in database 122 can be used by video-overlay matching module 120 to rapidly match the requested video with the corresponding overlays, and to identify a good location to place the matched overlays. In an embodiment, video-overlay matching module 120 is configured to perform calculations substantially in real-time, at the point when a request for a video is received at server 104 from video player 112.

According to one embodiment of architecture 100, video processing module 116 and overlay processing module 118 perform pre-calculations for uploaded and received video content and overlays, respectively, in order to enable video-overlay matching module 120 to expedite matching of video content to overlays. These calculations can be performed offline, after the uploads have completed and prior to subsequent matching of video content to overlays. The online matching of video content to overlays is more efficient when video-overlay matching module 120 does not need to determine or calculate properties of video content and overlays as matches are being identified. In this way, the computations performed by video-overlay matching module 120 can be limited to those needed to make a match or connection between particular overlays and video content.

Architecture 100 also allows matching of overlays to videos that takes into account metrics collected for viewer users 114. For example, server 104 can track which videos have been viewed before by a given viewer user 114 or an associated video player 112, so that the matching performed by video-overlay matching module 120 takes the particularities of the user into account when selecting and placing overlays.

In an alternative embodiment, instead of matching overlays with video content in near real-time when a video is requested via video player 112, the video-overlay matching module 120 is invoked after each overlay is uploaded via advertiser UI 110. In this embodiment, the matching and location identification computations are performed by video-overlay matching module 120 as each overlay is received by overlay processing module 118.

According to yet another embodiment (not shown), video-overlay matching module 120 is excluded from architecture 100 and its functionality is divided between video processing module 116 and overlay processing module 118. In this embodiment, in addition to indexing and storing video content and overlay properties data in database 112, video processing module 116 and overlay processing module 118 compute everything needed to match an overlay with video content at the time overlays are uploaded via advertiser UI 110. One way this embodiment could allow for efficient, if not real-time, overlay-video matching, is by periodically invoking routines to update video-overlay associations. For example, a scheduled task or job, could be run daily, hourly, or in other periodic increments to match overlays to video content, and to determine if any previously identified overlay-video matches are no longer valid. The periodic job could identify invalid pairings of overlays and video content in cases where an overlay has expired, has depleted its budget, or if either the overlay or video content is no longer available. In cases where architecture 100 and server 104 are implemented with a Unix-like operating system (OS) this scheduled task or job can be implemented as a cron job that periodically updates overlay-video associations and determines if any previously identified overlay-video association are no longer valid.

FIG. 1B is a block diagram illustrating components of an overlay placement system based on architecture 100 shown in FIG. 1A. As shown in FIG. 1B, an overlay placement system 130 includes server 104 and client devices 134, which can each include a processor 126 communicatively coupled to a memory 128. Overlay placement system 130 includes server 104, client devices 134a-n, and a network 106. Client devices 134a-n are coupled to server 104 via a network 106. Processors 126a-n are each configured to execute computer-executable program instructions and/or accesses information stored in respective ones of memories 128a-n. Server 104 includes a processor 123 communicatively coupled to a memory 124. Processor 123 is configured to execute computer-executable program instructions and/or accesses information stored in memory 124. Processors 123 and 126a-n shown in FIG. 1B may comprise a microprocessor, an application-specific integrated circuit ("ASIC"), a state machine, or other processor. For example, processor 123 can include any number of computer processing devices, including one. Processor 123 can include or may be in communication with a computer-readable medium. The computer-readable medium stores instructions that, if executed by the processor, cause one or more of processors 123 and 126a-n to perform the operations, functions, and steps described herein. When executed by processor 123 of server 104, the instructions can also cause processor 123 to implement the modules shown in FIGS. 1A and 1B. When executed by one or more of processors 126a-n of client devices 134a-n, the instructions can also cause processor to render the user interfaces shown in FIGS. 1A, 3 and 4 on respective ones of display devices 121a-n.

A computer-readable medium may comprise, but is not limited to, an electronic, optical, magnetic, or other storage device capable of providing a processor with computer-readable instructions. Other examples comprise, but are not limited to, a floppy disk, a CD-ROM, a DVD, a magnetic disk, a memory chip, ROM, RAM, an ASIC, a configured processor, optical storage, magnetic tape or other magnetic storage, or any other medium from which a processor such as processor 123 or processors 126a-n can read instructions. The instructions may comprise processor-specific instructions generated by a compiler and/or an interpreter from code written in any suitable computer-programming language. Non-limiting examples of a suitable programming language can include C, C++, C#, Visual Basic, Java, Python, Perl, JavaScript, and ActionScript.

Client devices 134a-n may also comprise a number of external or internal devices, including input devices such as a mouse, keyboard, stylus, touch sensitive interface. Client devices 134a-n can also comprise an optical drive such as a CD-ROM or DVD drive, a display device, audio speakers, one or more microphones, or any other input or output devices. For example, FIG. 1B depicts the client device 134a having a processor 126a, a memory 128a, and a display device 121a. A display device 121 can include (but is not limited to) a screen integrated with a client device 134, such as a liquid crystal display ("LCD") screen, a touch screen, or an external display device 121, such as a monitor.

FIG. 1B also illustrates client devices 134a-n including respective display devices 121a-n. Client devices 134 can render the publisher UI 108, advertiser UI 110 and video player 112 described above with reference to FIG. 1A. Client devices 134a-n can include one or more software modules or applications to configure their respective processors 126a-n to retrieve one or more renditions 125a-n of selected video content provided by server 104 via a network 106. Such modules and applications can configure the processor 126 to render a rendition 125 of the video content for display on display device 121.

Although FIGS. 1A and 1B depict video processing module 116, overlay processing module 118 and video-overlay matching module 120 as separate modules, one or more of these modules can be included as a software module of a single application. Similarly, while database 122 is shown in FIGS. 1A and 1B as being hosted locally on server

104, in alternative embodiments, database 122 can be hosted on an external server (not shown) remote from server 104. For example, database 122 can be hosted on a dedicated database server accessible from server 104 via network 106. Overlay placemen system 130 stores video content, overlays, and additional information such as video and overlay metadata in database 122. Some of the additional information may be explicitly specified or input when publishers and overlay providers upload video content and overlays. For example, titles, descriptions, and tags/keywords can be entered by publisher and advertiser users 114 at upload time. Other additional information may be computed and stored in database 122 in order to expedite subsequent operations and calculations carried out by video-overlay matching module 120. Descriptions of exemplary functionality of video processing module 116, overlay processing module 118 and video-overlay matching module 120 are provided in the following paragraphs.

According to an embodiment, video processing module 116 is configured to perform a set of video processing operations one time for a given item of video content, after the video content is uploaded to server 104. In this embodiment, the video processing operations are performed once because they are resource intensive, requiring relatively large amounts of processing and memory capacity from processor 123 and memory 124. The video processing operations performed by video processing module 116 can include saliency calculation, which involves identifying which regions of video content are more likely to attract viewer user 114 gazes and attention. Since these regions may represent essential spots of the video content, they are identified so that video-overlay matching module 120 can generally avoid them when inserting overlays. Saliency calculation is described in more detail below with reference to FIG. 7. Video processing module 116 can also perform video segmentation, wherein the structure of the video content is and other useful information is extracted from video content at upload-time. In one embodiment, such information can be stored in database 122. In cases where it is desirable to avoid placing overlays that span scene transitions (i.e., for aesthetic or other reasons), video-overlay matching module 120 can be configured to use the structure information extracted and stored by video processing module 116 to place overlays so that they do not span multiple scenes. Video processing module 116 can also be configured to perform scene intensity evaluation for uploaded video content. The results of this evaluation can be used to place overlays into relatively more intense scenes, while also ensuring that the overlay locations do not overlap with important objects. The scene intensity evaluation can include scene understanding techniques using various heuristics, such as estimating motion in scenes as a measure of relative intensity of scenes in uploaded video content. The scene intensity evaluation can also use different channels, such as sound, to determine relative intensity of scenes in the video content.

In an embodiment, video processing module 116 can be configured to perform color palette extraction by identifying a few most representative colors for the video content. In order to have a visually pleasing effect when inserting an overlay, it can be preferable to select an overlay that has colors (i.e., color scheme or color palette) as close as possible to those of a zone of frames the overlay is being inserted into. In additional or alternative embodiments, video processing module 116 can be further configured to perform object detection in order to enable better matching between video content and overlays by automatically extracting semantic knowledge from the video content. A non-limiting example of such semantic knowledge is knowledge of which objects are present within frames of the video content.

In a similar manner to the above described functionality of video processing module 116, an exemplary overlay processing module 118 can be configured to compute one time information about an overlay after the overlay has been uploaded to server 104. In an embodiment, overlay processing module 118 is invoked after an advertiser user 114 pushes or uploads a new overlay via advertiser UI 110. According to one embodiment, overlay processing module 118 is responsible for storing information about the uploaded overlay in database 122.

In additional or alternative embodiments, instead of invoking or executing video processing module 116 and overlay processing module 118 synchronously as described above, calls to these modules can be queued for later execution. In this way, the video and/or overlay processing functions described above can be processed later, well after upload-time, which can improve the end user experience for a publisher and/or advertiser user 114 by expediting uploads of video content and/or overlays.

In an embodiment, video-overlay matching module 120 is invoked when a viewer user 114 user selects a particular video asset or video content for viewing. The selection can be made, for example, in the user interface of video player 112 executing at client device 134*a*, via interaction with a remote control or other input device at a set top box (STB) client device 134*b*, via a touch screen display device 121, or other user input at a client device 134. The selection is then sent as a request from the client device 134 to server 104 via network 106. In one embodiment, when the request for the selected video content is received at server 104, video-overlay matching module 120 queries database 122 to find overlays to be inserted into the requested video content. In this embodiment, the query results in indications of the overlays and their properties being returned to video-overlay matching module 120, where the query includes indications of at least some properties of at least one of the selected video content, the requesting client device 134, and the viewer user 114. Based at least in part on properties of overlays returned by database 122 and properties of the requested video content, video-overlay matching module 120 also determines some appropriate spatial locations (i.e., coordinates within zones or regions of the viewable video content) and temporal positions (i.e., starting/ending points in frames of the video content) to insert the overlays. In the exemplary embodiment shown in FIG. 1B, video-overlay matching module 120 consists of two sub-modules or components, an overlay ranking module or overlay ranker 129, and an overlay scheduler 131. Exemplary functionality of these components is described below.

According to an embodiment, overlay ranker 129 is invoked by video-overlay matching module 120 in order to find overlays that are most related to the requested video content (i.e., overlays that best fit the video content). In one exemplary implementation, overlay ranker 129 consists of two separate parts or subcomponents, which each evaluate one of two criterions to determine the degree to which the selected video content and an overlay fit together. The first criterion evaluated is semantic similarity between the selected video content and overlays. Semantic similarity can be based at least in part on keywords and other metadata associated with video content and overlays. Overlay providers such as advertisers may insert keywords along with their overlays in order to express their preference toward having their overlays placed in video content related to certain subject matter. Semantic similarity is evaluated in order to try to match overlays and video content based on their respective tags/keywords and other content properties because semantically related overlays are more likely to be of interest to a viewer user 114.

Semantic matching can involve understanding the contents of a video asset combined with knowledge of the overlays to be placed. Overlays can be annotated with some keywords in order to give hints regarding the kinds of video content that the advertiser user 114 would like the overlays to appear in. Similarly, video content may be tagged with keywords, or some words could be extracted from the title property or other metadata. Even if a few words are available regarding the genre, category and/or content of the video asset, matching the overlays can include use of an ontology (e.g., the WordNet lexical database of English) and extract related words using the tags or keywords, which would entail obtaining a similarity by analyzing how often two words appear together in a large amount of text. In embodiments using an ontology such as WordNet, nouns, verbs, adjectives and adverbs are grouped by synonymy, in groups called synsets. A synset is a group of synonyms forming an equivalence class such that replacing one word in a synset with another word in the same synset does not change the meaning of a phrase including the word. Besides this grouping, WordNet also offers semantic relations between synsets. These relationships vary depending on the part of speech. For nouns, there are hypernyms (Y is a hypernym of X if and only if any X is also an Y), hyponyms (Y is a hyponym of X if and only if any Y is also an X), coordinate terms (X and Y are coordinate terms if they share a hypernym), holonyms (Y is a holonym of X if and only if X is part of Y), meronyms (Y is a meronym of X if and only if X is a holonym of Y). Similar semantic relations can be defined for verbs: hypernyms, troponyms, entailment, coordinate terms; adjectives: related nouns, similar to, participle of verb; adverbs: root adjectives. Wordnet also offers the polysemy count of a word: the number of synsets that a word belongs to. If a word belongs to multiple synsets (i.e. homonymy), then some meanings are probably more frequent than others. This is quantified by frequency score, which can be obtained by annotating large amounts of text with the corresponding synset of each word.

Certain embodiments can use additional, more elaborate measures developed around WordNet, such as, for example, the Resnik measure that captures the similarity of two words by taking into account the information brought by the most specific concept that subsumes them. For example, given two concepts, C1 and C2, embodiments may only look at the 'is-a' relations, going up in a hierarchy until a common parent, P, is found. Then, a measurement of how informative the subsuming concept can be taken by summing up all frequency counts of the words representing or subsumed by that concept (i.e. if the hierarchy would contain one top concept which subsumes any other concept, then that top concept would have a frequency of 1, and an informativity of 0). An advantage of using the Resnik measure, which employs term frequency against a shortest path, to determine semantic similarity is that it is independent of terminology density around concepts on the path. For example, if only a few terms exist in a certain domain, using the Resnik measure makes it possible to reach general concepts within a very small number of steps. In cases where overlay placement system 130 is provided with a set of keywords/tags describing video content and needs to find an overlay that is semantically related, based on the keywords/tags, that describe the overlay, these keywords can represent words that would be targeted by the overlay. In terms of information retrieval from database 122, the video keywords represent the database query, and the overlay description represents the database records or documents to be retrieved from database 122.

In cases where multiple overlays are targeting a certain keyword, the importance of a semantic match remains important. One embodiment determines when two or more overlays have the same number of keywords, and the overlay that matches more keywords with video content is deemed to be the preferable semantic match. In this embodiment, when two or more overlays match the same number of keywords, the overlay with a shorter description is deemed to be the preferable semantic match. An exemplary formula that satisfies these conditions is expressed as:

$$\frac{|Ad_{description} \cap Video_{description}|}{f(|Ad_{description}|)}$$

where $Ad_{description}$ and $Video_{description}$ represents the set of keywords describing the overlay and the video content, respectively, and and $f: N \rightarrow R$ is a non-decreasing function. Certain embodiments use $f(x)=1$ for this function. In cases where there are a scarcity of words that may describe both the overlays and the video content, another version of that formula can be used, which would handle cases when all video content keywords and overlay description words are either identical, or completely unrelated.

One embodiment can use the Resnik method described above in order to measure the word similarity. For example, instead of counting how many words are shared between video content and the overlay, this embodiment can, for each video content keyword or word in the video content description property, take into account the most similar word in the overlay description using the Resnik measure, which will yield a number between 0 and 1, as the weight. The formula implemented in this embodiment can be expressed as:

$$SemanticDistance(Video, Ad) = \frac{\sum_{V \in Video_{description}} \max_{A \in Ad_{description}} Resnik(V, A)}{f(|Ad_{description}|)}$$

where $f: N \rightarrow R$ is a non-decreasing function. According to this embodiment, for given video content, the similarity score of the overlay description is calculated by server 104 for every overlay, and the overlays with a higher score are more likely to be inserted into that video content.

A second criterion that can be considered is visual similarity between the selected video content and overlays. Having an overlay blend better into video content can result in a better overall experience for the viewer user 114, which can in turn result in positive implications for the video content publisher and overlay provider (i.e., the advertiser). In embodiments, the degree of visual similarity between video content and an overlay is based in part on their respective color palettes. For example, if an overlay and the video content only contain contrasting colors then they are deemed to not have a high degree of visual similarity. Certain embodiments extract the color palette from the overlays and also from a few frames of video content. In one embodiment, based on colors extracted from video content, a query is submitted to retrieve overlays from database 122 including overlays with the most similar colors to the extracted video content colors. This embodiment results in selecting visually similar overlays whose insertion into the video content will be less obtrusive, leading to a more pleasant experience for a viewer user 114. The color palette of a video frame or overlay image represents a set of representative colors for the frame or image. Given a video and an overlay, a distance is computed by using the overlay and video color palettes. For each color extracted from the video palette, an embodiment considers the most similar color in the overlay. In one embodiment, color similarity can be based on colors having the smallest Euclidian distance from each other in a hue, saturation and brightness (HSB) or hue, saturation, and lightness (HSL) coordinate space. In order to compute the Euclidean distance for an overlay, an embodiment adds logarithms of the distances between each color in the video palette and the most similar color from the overlay color palette. This addition can be expressed formulaically as:

$$\text{VisualDistance}(\text{Video}, \text{Ad}) = \sum_i \log\left(\min_j \text{dist}(pallete_{video}[i], pallete_{ad}[j])\right)$$

In this embodiment, adding the logarithms is equivalent to multiplying the quantities inside, but uses the logarithm in order to avoid numerical problems as HSB coordinate values are in [0, 1], so the product of distances can quickly result in a 0/zero value. The above exemplary formula can be conceptualized as a product of distances. Having a product of multiple values for the distance, embodiments favor the case when one of the values is close to 0, which can be conceptualized as an algorithm that takes into account the most similar pair of colors.

Certain embodiments match overlays to particular video based at least in part on visual similarity between an overlay and video content, first selecting a number of candidate overlays based on semantic similarity, and afterwards filtering the list to use those also having at least some degree of visual similarity. One embodiment sorts overlays in descending order of semantic similarity, and only a few of the top performing (i.e., most semantically similar) overlays are considered for the next stage. In the next stage, overlay selection is based on the visual similarity score. Variations of this embodiment can control the outcome of these stages by changing the number of overlays to be considered after the semantic similarity scores are computed. In this way, based on both semantic and visual similarity criteria, overlay ranker 129 produces a list of overlays ranked according to how well they fit into the selected video content. According to embodiments, this ranked list can be stored in memory 124 or in database 122. In alternative embodiments, overlay ranker 129 produces a list of overlays ranked only on one of semantic or visual similarity.

In one embodiment, overlay scheduler 131 is invoked by video-overlay matching module 120 after overlays have been ranked by overlay ranker 129. Overlay scheduler 131 then determines spatial and temporal positions for the ranked overlays. Overlay scheduler 131 can be supported by the pre-processing previously done for both the overlays and for the selected video content, by overlay processing module 118 and video processing module 116, respectively. By using the results of the saliency extraction along with the video and overlay properties previously stored, overlay scheduler 131 can expedite placement and scheduling of ranked overlays within the selected video content.

In an embodiment, client devices 134 comprise one or more video navigation devices, such as, but not limited to, an input device configured to interact with browser-based UI of a video player 112, a touch screen display device 121, and a set top box (STB). Exemplary STB client device 134b can include, without limitation, an Internet Protocol (IP)-based (i.e., IPTV) STB. Embodiments are not limited to this exemplary STB client device 134b interfacing with network 106, and it would be apparent to those skilled in the art that other STBs and video navigation devices can be used in embodiments described herein as a client device 134, including, but not limited to, personal computers, mobile devices such as smart phones, laptops, tablet computing devices, digital video disc (DVD) devices, or other devices suitable for rendering renditions 125 of video content on display device 121. Many additional client devices 134a and STB client devices 134b can be used with overlay placement system 130, although only one STB client device 134b is illustrated in FIG. 1B. In an embodiment, a client device 134 may be integrated with a display device 121, so that the two form a single, integrated component. Client devices 134a-n can include any suitable computing devices for communicating via network 106, rendering the publisher UI 108, advertiser UI 110 and/or executing video player 112.

As shown in FIG. 1B, each of the client devices 134a-n is coupled to sever 104 through network 106. Although not depicted in FIG. 1B, in an alternative embodiment, server 104 can be located separately from database 122. Client devices 134 receive operational commands from users 114, including commands to initiate uploads of video content via publisher UI 108, commands to initiate uploads of overlays via advertiser UI 110, and commands to navigate to, select, and view video content via video player 112. A remote control (not shown) or other input device may be used to control operation of STB client device 134b. Some STBs may have controls thereon not requiring the use of a remote control. The remote control is configured with buttons to control the STB client device 134b, including play a video, order a video asset (i.e., a pay-per-view VOD asset), add a video asset to a cart, retrieve information about video content, view cart, preview similar video content (i.e., more like this), etc. In an embodiment, the cart is a convenient storage location for quick access to video assets a viewer user 114 is likely to eventually want to order, wherein ordering initiates delivery of rendition 125b of the ordered video asset.

It is to be appreciated that the server 104 could provide renditions 125 of any type of audio/visual content. Video playing and viewing sessions as described herein refer to any video content that is, generally, available for delivery to an individual client device 134, with delivery initiated upon an explicit request from that client device 134. Video viewing sessions may also be referred to as a "session" herein. Server 104 may also be referred to as a "server" herein. In an example, a video viewing session is one or more of a video content viewing session or a video game session wherein video game assets can be previewed and ordered. In a video viewing session, server 104 may provide a rendition 125 of video content stored in database 122 or remotely at a publisher's web server. The rendition will include one or more overlays inserted into non-obtrusive locations by video-overlay matching module 120. In a video game session, server 104 runs a video game, for example, on processor 123 and allows a client device 134 to play a preview of the video game remotely.

According to an embodiment, overlay placement system 130 displays an administrator UI (shown in FIG. 3) including publisher UI 108 and advertiser UI 110 and a UI for video player 112 (shown in FIG. 4) on display device 121. In embodiments, display device 121 may be one or more of a television, a network-enabled television, a monitor, the display of a tablet device, the display of a laptop, the display of a mobile phone, or the display of a personal computer. In an embodiment, one type of client device 134b is a cable set top box (STB) connected to a display device 121b. In this embodiment, display device 121b may be a television or monitor connected to STB client device 134b.

Server 104 can provide renditions 125a-n of selected video content via the network 106. Renditions 125a-n include the video content with inserted overlays matched to the content. In embodiments, a particular one of renditions 125a-n can optionally include overlays matched to video content by video-overlay matching module 120, where the matching is based in part on characteristics of a particular one of client devices 134a-n where a particular one of renditions 125a-n is to be viewed. Renditions 125a-n may be resident in any suitable computer-readable medium, database 122, memory 124, and/or memories 128a-n. In one embodiment, a particular one of renditions 125a-n is provided in a resolution compatible with a particular display device 121a-n of a client device 134a-n that requested the video content. In one embodiment, the renditions 125a-n can reside in memory 124 of server 104. In another embodiment, the renditions 125a-n can be accessed by the server 104 from a remote location via network 106 and provided to the client devices 134a-n. Each of the renditions 125a-n can include a copy of some or all of the requested video content encoded at a given bit rate and/or bit size appropriate for the requesting client device 134.

Server 104 can include any suitable computing system for hosting the video content, video processing module 116, overlay processing module 118 video-overlay matching module 120, and database 122. As shown in FIG. 1B, server 104 includes a processor 123 coupled to a memory 124. In one embodiment, server 104 may be a single computing system. In another embodiment, server 104 may be a virtual server implemented using multiple computing systems or servers connected in a grid or cloud computing topology. As described below with reference to FIG. 10, processor 123 may be a single processor in a multi-core/multiprocessor system. Such system can be configured to operate alone with a single server 104, or in a cluster of computing devices operating in a cluster or server farm.

Network 106 may be a data communications network such as the Internet. In embodiments, network 106 can be one of or a combination of a cable network such as Hybrid Fiber Coax, Fiber To The Home, Data Over Cable Service Interface Specification (DOCSIS), Internet, Wide Area Network (WAN), WiFi, Local Area Network (LAN), ATM or any other wired or wireless network. Server 104 may store and stream video content including but not limited to online video, television programs, television broadcasts/simulcasts, movies, and video games.

Client devices 134a-n can establish respective network connections with server 104 via network 106. One or more of publisher UI 108, advertiser UI 110, and/or video player 112 can be executed at a client device 134 to establish a network connection via network 106. The network connection can be used to communicate packetized data representing video content between the client device 134 and server 104. Server 104 can provide one or more of renditions 125a-n of video content with overlays to client devices 134a-n in response to requests for the video content corresponding to the renditions 125a-n.

For example, sever 104 can provide a rendition 125 of requested video content as streaming audiovisual content. Video player 112 can access the streaming audiovisual content by retrieving one or more of renditions 125a-n via network 106. Server 104 can provide a rendition as packetized data. Video player 112 can configure the processor 126 to render a retrieved rendition 125 for display on display device 121.

In response to receiving a request from a client device 134, server 104 and its video-overlay matching module 120 can determine overlays and a quality level for a rendition 125 of video content to be retrieved by video player 112. Video-overlay matching module 120 can apply one or more of the video-overlay matching criterion to generate a rendition 125 including overlays deemed relevant to the requested video content. In certain embodiments, properties of the requesting client device 134 can also be used by video-overlay matching module 120 to select overlays. For example, if a particular client device 134 is a mobile device, overlays related to mobile device's products and services can be inserted into the rendition 125 provided to the client device 134. Also, for example, in response to determining that a requesting client device 134 is located in a given geographic region, or physical location (i.e., based on a Global Positioning System (GPS) location of the client device 134, a media access control (MAC) address of the client device 134, a network address of the client device 134, or other identifying information, server 104 can provide a rendition 125 of the requested video content with overlays deemed pertinent to the determined location or time zone. Server 104 can also determine an ideal quality level for a rendition 125 based at least in part on determining current communication capabilities, network connectivity (i.e., download speed), and/or a hardware profile of the requesting client device 134.

Figure 2:
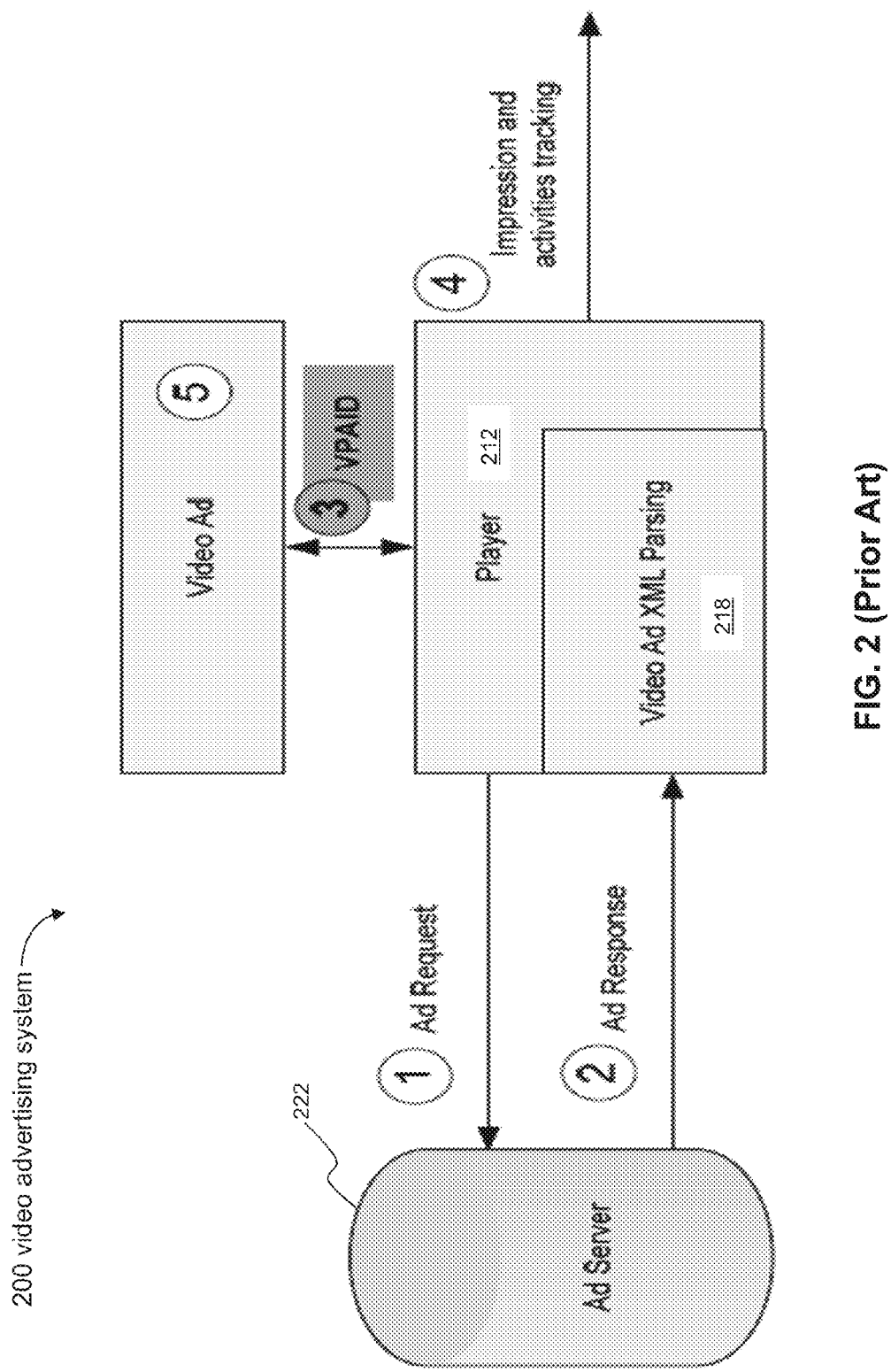
FIG. 2 is a block diagram illustrating communications flows between components of a prior art system for processing in-stream video advertisements displayed in digital video players.

FIG. 2 illustrates communications flows between components of a prior art system for processing in-stream video advertisements displayed in digital video players. In particular, FIG. 2 depicts a video advertising system 200 that implements pre-defined standards for playing advertisements inside a video player 212 along with certain video content. FIG. 2 shows that at least five enumerated steps are required for video advertisement ('ad') flows in video advertising system 200. As described below, video advertising system 200 also requires multiple interface points as part of the communication flow for video advertising system 200 merely provides a standard compliant video advertisement server 222. Advantages of architecture 100 and overlay placement system 130 include providing the partially and fully automated overlay placement features discussed above with reference to FIGS. 1A and 1B without requiring the steps and multiple interface points required by video advertising system 200.

Video advertising system 200 requires protocols that make it possible to show both a video and separate advertisement media inside video player 212. FIG. 2 illustrates how video advertising system 200 is implemented using such protocols. Other advantages of architecture 100 and overlay placement system 130 include the ability to directly modify video content to render edited video content including placed and transformed overlays. In this way, embodiments disclosed herein can display renditions 125 of video content with overlays without requiring protocols such as those used in video advertising system 200.

As shown in FIG. 2, in video advertising system 200, the flow for placing a video advertisement requires several steps and interfaces. In step 1, a video player 212 submits an advertisement request by making an advertisement call to advertisement server 222. Then, in step 2, advertisement server 222 responds with an Extensible Markup Language (XML) file including a reference to an advertisement, and a video advertisement XML parsing module 218 parses the XML file to retrieve the reference to the advertisement. Step 2 and other steps shown in FIG. 2 do not incorporate results of any calculations regarding where to place an advertisement. In contrast to video advertising system 200, another advantage of overlay placement system 130 is that calculations can be used to automatically determine unobtrusive locations to place an overlay. Next, in step 3, video player 212 retrieves advertisement media referred to in the XML file and renders the advertisement media. According to video advertising system 200, displaying advertisement media typically requires a set of parameters from video player 212, which can require interaction between the video advertisement XML parsing module 218 and video player 212 using an application programming interface (API). In video advertising system 200, an API is required for any pre-roll advertisement media that runs a script or any interactive, clickable advertisement media. In step 4, video player 212 fires impression and activity reporting beacons. Lastly, in step 5, the advertisement media is rendered.

Figure 8:
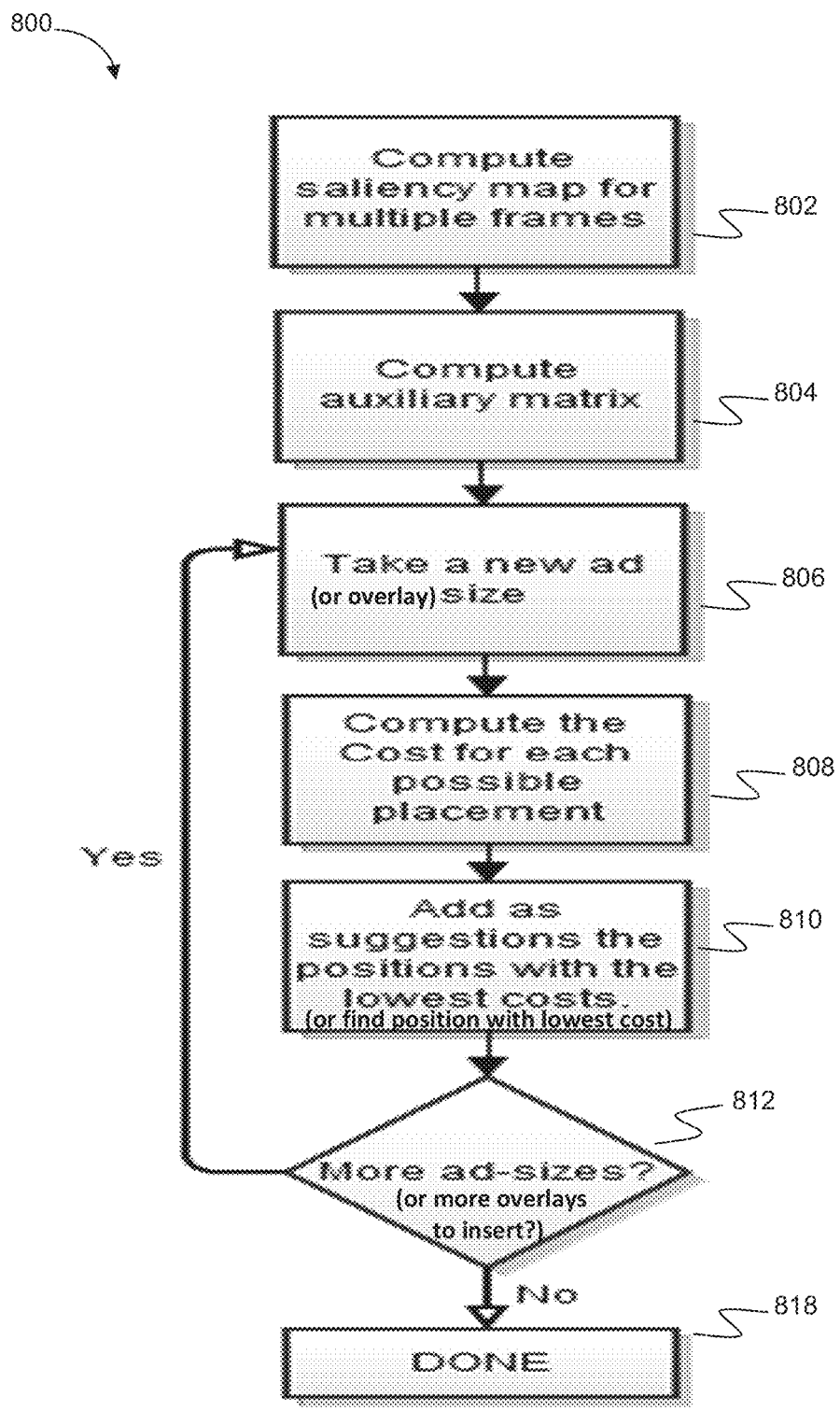
FIG. 8 is a flow chart illustrating an example method for suggesting overlay locations, in accordance with embodiments.
Figure 9:
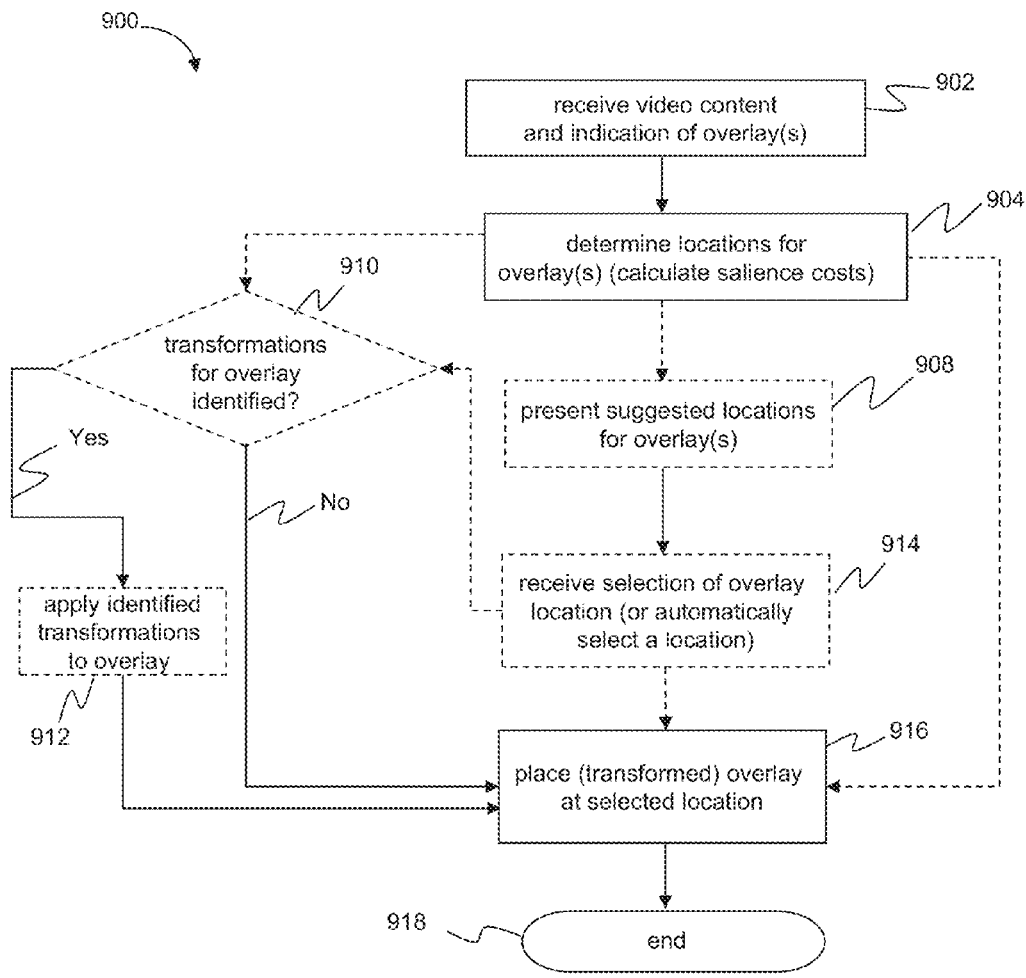
FIG. 9 is a flow chart illustrating an example method for placing an overlay in video content, in accordance with embodiments.

In video advertising system 200, a protocol between video player 212 and the advertisement is required. The protocol includes methods that the advertisement must implement, and video player 212 must call the methods when certain events occur. Examples of such methods are resizeAd, startAd, stopAd, pauseAd, resumeAd, collapseAd, expandAd. In video advertising system 200, an advertisement can only implement special behavior, such as resizing, when a method is explicitly called. For example, when the screen size on which an advertisement appears changes, an advertisement can dynamically choose its layout depending on the available area by implementing this functionality in the resizeAd method. Other advantages of overlay placement system 130 and methods 800 and 900 described below with reference to FIGS. 8 and 9 is that the system and methods do not require the protocol or method calls needed in video advertising system 200.

Exemplary User Interfaces

Figure 3:
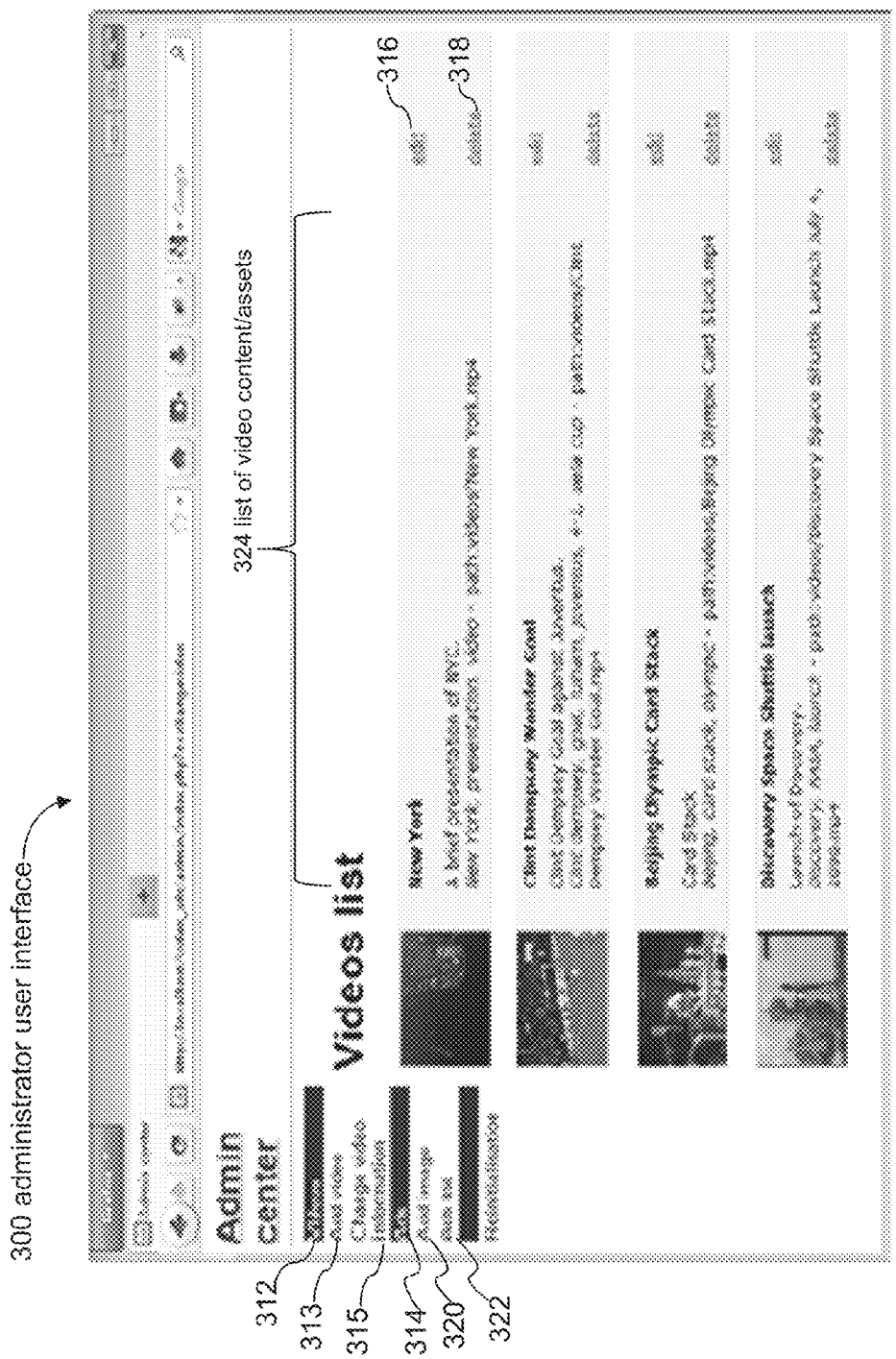
FIG. 3 illustrates an example administrator interface for an overlay placement system, in accordance with embodiments.

FIGS. 3 and 4 illustrate exemplary administrator and video player user interfaces (UIs), according to embodiments of the present disclosure. The UIs depicted in FIGS. 3 and 4 are described with reference to the embodiments of FIGS. 1A and 1B. However, the UIs are not limited to those example embodiments. In an embodiment, the interfaces for video player 112, publisher UI 108, and advertiser UI 110 are implemented as the UIs illustrated in FIGS. 3 and 4. The UIs can be displayed on client devices 134a-n on respective ones of display devices 121a-n.

In FIGS. 3 and 4, displays are shown with various icons, command regions, windows, toolbars, menus, and buttons that are used to initiate action, invoke routines, upload video content, upload overlays, preview video content, select video content for viewing, or invoke other functionality. The initiated actions include, but are not limited to, uploading new video content, entering/editing video properties, deleting video content, uploading overlays, previewing video content, selecting video content for viewing, controlling playback of video content, and other video and overlay-related inputs. For brevity, only the differences occurring within the figures, as compared to previous or subsequent ones of the figures, are described below.

In embodiments, the display devices 121a-n used to display the user interfaces shown in FIGS. 3 and 4 may be displayed via the display interface 1002 and the computer display 1030 described below with reference to FIG. 10. In certain embodiments, the UIs can be configured to be displayed on a touch screen display device 121. According to embodiments, a publisher, advertiser, and/or viewer user 114 can interact with the UIs shown in FIGS. 3 and 4 using input devices such as, but not limited to, a stylus, a finger, a mouse, a keyboard, a keypad, a joy stick, a voice activated control system, or other input devices used to provide interaction between a user 114 and the UIs. As described below with reference to FIGS. 3 and 4, such interaction can be used to indicate an overlay or video asset to be uploaded, to navigate through multiple overlays or previously-uploaded video assets, and to select a video asset to be viewed.

FIG. 3 illustrates an exemplary administration panel (i.e., an administrator user interface). In one embodiment, publisher and advertiser users 114 can both be provided with certain administrator privileges in overlay placement system 130 and are granted access to respective portions of administrator user interface 300. After providing login credentials and authenticating to the overlay placement system 130, a publisher user 114 can launch the browser-based administrator user interface 300. As seen in FIG. 3, administrator user interface 300 includes publisher menu 312, which has an add video link 313 and a change video information link 315. By selecting, using an input device, add video link 313, a publisher user 114 can launch a web-form (not shown) which allows the publisher to upload video content into overlay placement system 130. For example, a publisher user 114 can select a local video file and enter additional upload information, such as, but not limited to, tags/keywords, a title, and a brief description. The new video is then uploaded in response to a selection of an upload button (not shown). One embodiment indicates within administrator user interface 300 whether the video was successfully uploaded or not. Other embodiments communicate upload status via an email message to the publisher user 114 or other communications means.

As shown in FIG. 3, administrator user interface 300 includes a pane with a videos list 324. Videos list 324 includes previously-uploaded video assets and indicates their properties. In an embodiment, videos list 324 is displayed in response to change video information link 315 in publisher menu 312 being selected. In the example embodiment illustrated in FIG. 3, for each asset in videos list 324, a preview thumbnail is displayed along with a title, description, keywords, and a URL indicating where the video asset is located. The preview thumbnail includes at least one frame of the video asset, and can optionally be implemented as an animated icon that changes over time (i.e., is not static). One type of animated icon displays a sequence of frames from the video asset (i.e., as a slide show). In some embodiments, animation of an animated icon does not necessarily require user interaction or user stimulus and the animation occurs on its own. For example, a preview thumbnail can be configured to play (e.g., once or repeatedly) at least some portion of its associated video content. In one embodiment, different points in time or snapshots of the video content are shown in the preview thumbnail. In various embodiments, animation is triggered or activated by an input device or mouse rollover (i.e., having a mouse, stylus, finger or other input device hover over or near a preview thumbnail without necessarily clicking on or selecting the thumbnail). In some embodiments, an animation plays only once in response to detecting a rollover or hover. In alternative or additional embodiments, the video content is played or looped until the rollover or hovering ends (i.e., the cursor, pointer or input focus is no longer hovering over or near the preview thumbnail).

Videos list 324 also includes an edit link 316 and a delete link 318 for each listed video asset. A publisher user 114 can edit properties of a video asset by using an input device to click edit link 316. By selecting, using an input device, delete link 318, a publisher user 114 can delete a video asset from videos list 324. In certain embodiments, such a deletion triggers deletion of the video asset from overlay placement system 130 and its database 122. If the deletion is successful, the publisher user 114 can be informed via an indication within administrator user interface 300, an email message, or other communications means.

Administrator user interface 300 also includes an overlay provider menu 314 (labeled as an 'Ads' menu in the non-limiting example embodiment of FIG. 3), which has an add image link 320 and an overlay list link 322 (labeled 'Ads list' in the example shown in FIG. 3). After providing login credentials and authenticating to overlay placement system 130, an advertiser user 114 can launch administrator user interface 300 and select, using an input device, add image link 320 in order to launch a dialog box (not shown) which allows the publisher to select a local image for an overlay to be uploaded into overlay placement system 130. By interacting with administrator user interface 300, an advertiser user 114 can select a local image file for an advertisement and enter additional upload information, such as, but not limited to, tags/keywords related to the product, service, and/or brand that is the subject of the advertisement. The new overlay is then uploaded in response to a selection of an upload button (not shown). One embodiment indicates within administrator user interface 300 whether the overlay was successfully uploaded or not. Other embodiments communicate upload status to the advertiser user 114 via an email message, a Short Message Service (SMS) text message, or other communications means.

Although not shown in FIG. 3, an embodiment of administrator user interface 300 also includes a pane with an overlay list that is similar to the videos list 324 depicted in FIG. 3 and described above. Akin to videos list 324, the overlay list includes previously-uploaded overlays and indicates their properties. In one embodiment, the overlays list is displayed in response to overlay list link 322 in overlay provider menu 314 being selected. As with videos list 324, a preview thumbnail for each overlay can be displayed along with tags/keywords associated with each overlay. Overlay list also includes edit link 316 and delete link 318 for each listed overlay. An advertiser user 114 can edit properties of an overlay by using an input device to click edit link 316. When an overlay provider no longer wishes to have an overlay placed into video content, an advertiser user 114 can select, using an input device, delete link 318, to delete such an overlay from the overlays list. In certain embodiments, deletion of an overlay from the overlays list triggers deletion of the overlay from overlay placement system 130 and its database 122. If the deletion is successful, the advertiser user 114 can be informed via an indication within administrator user interface 300, an SMS message, an email message, or other communications means.

FIG. 4 illustrates an exemplary user interface for video player 112. In one embodiment, viewer users 114 executing video player 112 on a client device 134 have certain video viewing privileges. As shown in FIG. 4, video player user interface 400 includes video controls 412, which can be used, for example, to play, fast forward, rewind, and stop playback of video content 404 that has been selected for playback. Video controls 412 also include an audio volume control and a full screen toggle button for viewing video content 404 in full screen mode within video player user interface 400. Video player user interface 400 also displays video properties 410 for the selected video content 404. As seen in FIG. 4, exemplary video properties 410 for selected video content and/or other video content available for viewing (labeled as 'Random video' in the example illustrated in FIG. 4) can include a title, description, tags/keywords, and a URL indicating where the video is located. As depicted in FIG. 4, overlays 406 inserted into video content 404 currently being viewed are displayed along with the video content. This is because video player user interface 400 displays a rendition 125 of the selected video content 404 that includes overlays 406 placed by a publisher and/or overlay placement system 130. Certain overlays 406 may be included as part of the video content 404 that was uploaded into overlay placement system 130 by a publisher user 114 via publisher UI 108. Although the exemplary overlays 406 shown in FIG. 4 convey information regarding the publisher (i.e., the original broadcaster and distributor of the video content) and status or category (e.g., 'live') of the selected video asset, as described above and shown in FIGS. 5A and 5B, other overlays 506 can be embodied as advertisements placed in various, non-obtrusive locations within video content 404 by overlay placement system 130.

Besides being usable to control playback of a currently selected video, video player user interface 400 allows a viewer user 114 to navigate a videos list to preview, select, and view other video content. As seen in FIG. 4, the videos list can include a preview thumbnail and video properties 410 for a suggested or 'Random video.' In the example embodiment illustrated in FIG. 4, for each video asset in the videos list, a preview thumbnail is displayed along with video properties 410 including a title, description, keywords, and a URL indicating where the video asset is located. The preview thumbnail includes at least one frame of the listed video asset, and can optionally be implemented as an animated icon that displays at least a portion of the associated video content as described above with reference to videos list 324 shown in FIG. 3. In cases where the preview thumbnail is implemented as an animated icon, overlays inserted into a rendition 125 of the video content being previewed can optionally be displayed. For example, if a frame or frames of the video content being previewed include inserted overlays, those overlays can also be displayed within the preview thumbnail. As seen in FIG. 4, video properties 410 of video content in the video list include a clickable, actionable link that a viewer user 114 can select, using an input device, to view a listed video asset.

Figure 5A:
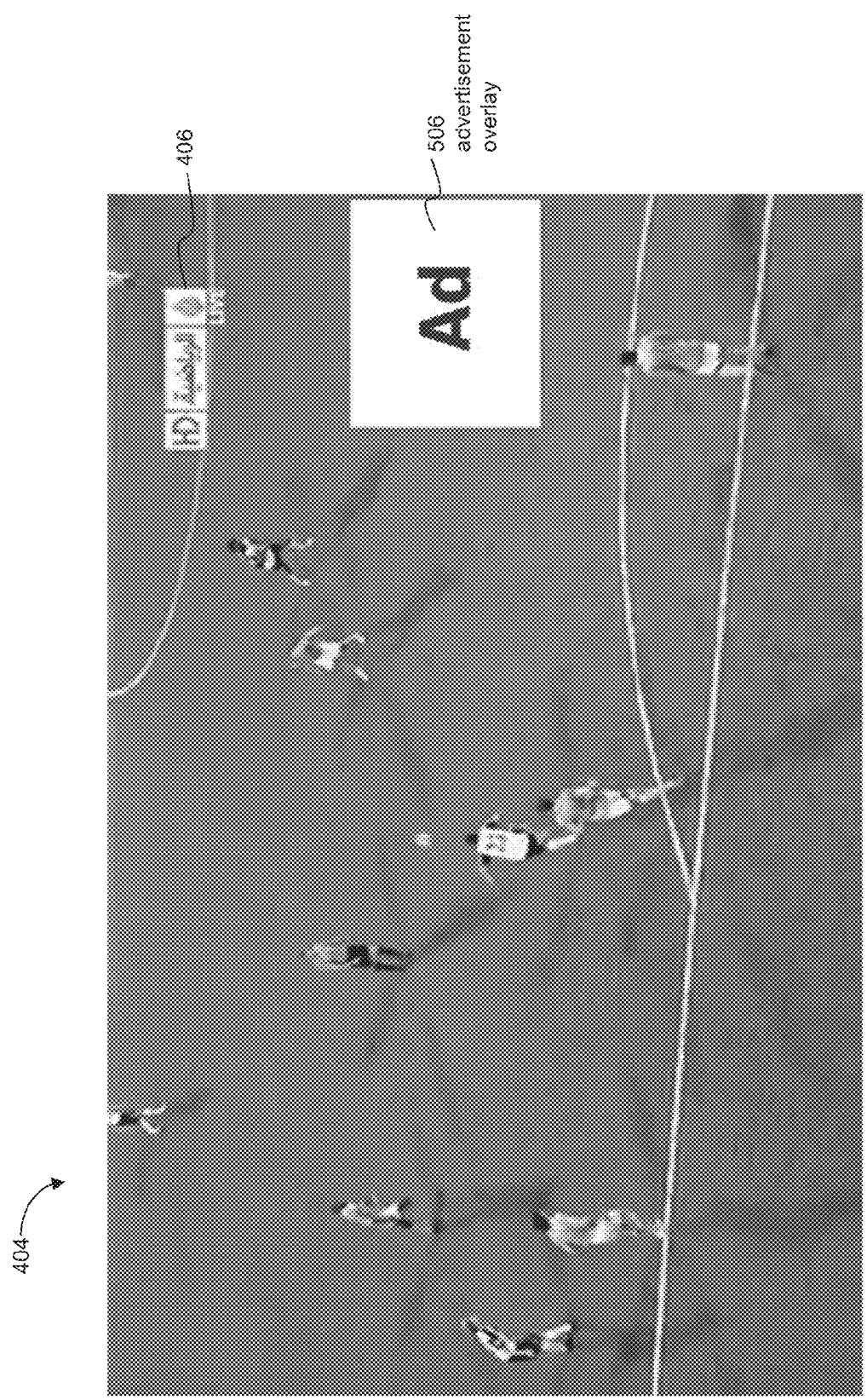
FIGS. 5A and 5B depict exemplary overlays placed within various locations of frames of video content.
Figure 5B:
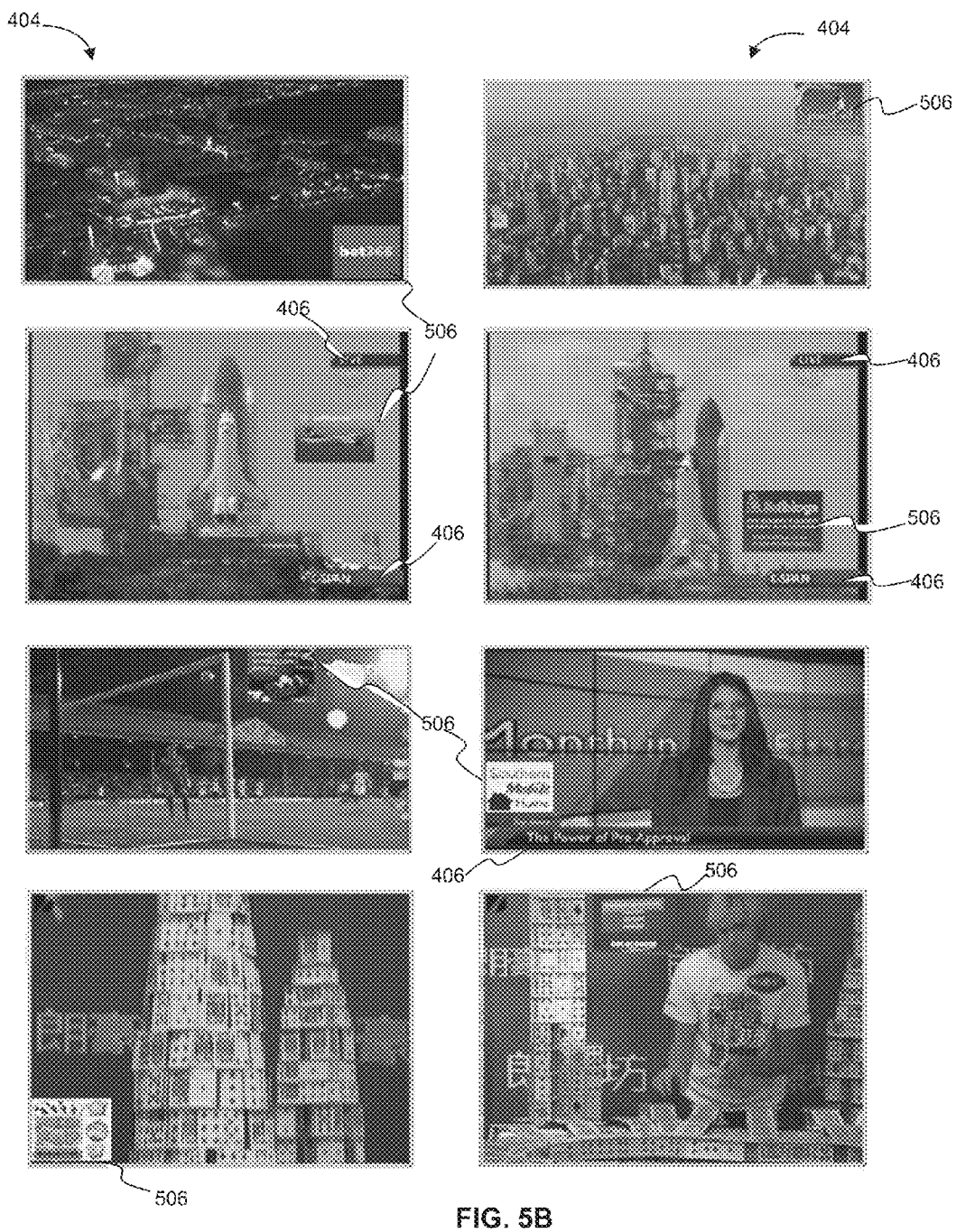

FIGS. 5A and 5B show exemplary overlays placed within various locations of frames of video content. As seen in FIG. 5A, multiple overlays 406, 506 can be placed within a frame of video content 404. The overlays shown in FIGS. 5A and 5B are described with reference to the embodiments of FIGS. 1A and 1B. However, the overlays are not limited to those example embodiments.

FIG. 5A shows a frame of a rendition 125 of video content 404 that includes an overlay 406 placed in a predetermined location and another overlay 506 placed in an unobtrusive location selected by overlay placement system 130. In the example embodiment of FIG. 5A, overlay 406 conveys properties 410 of the video content (i.e., the format, high definition—'HD', the original publisher/distributor/broadcaster—television network, and status—'live'), whereas overlay 506 is an advertisement placed in another location within the same video content 404. As seen in FIG. 5A, overlay 506 has been placed in an unobtrusive location that does not overlap important elements or objects within video content 404. For example, overlay 506 does not overlap any portion of overlay 406, any players, or the ball in the sports scene shown in FIG. 5A.

FIG. 5B shows several example placements of overlays 406 and 506 within various renditions 125 of video content 404. As shown in FIG. 5B, depending on the location of important elements in various video content 404, overlays 506 can be placed in different locations so as to avoid overlapping with the important elements. This is in contrast to overlays 406 placed in predetermined or predefined locations, such as, for example the bottom or top of frames of video content 404, which can result overlap with an important element.

Figure 6:
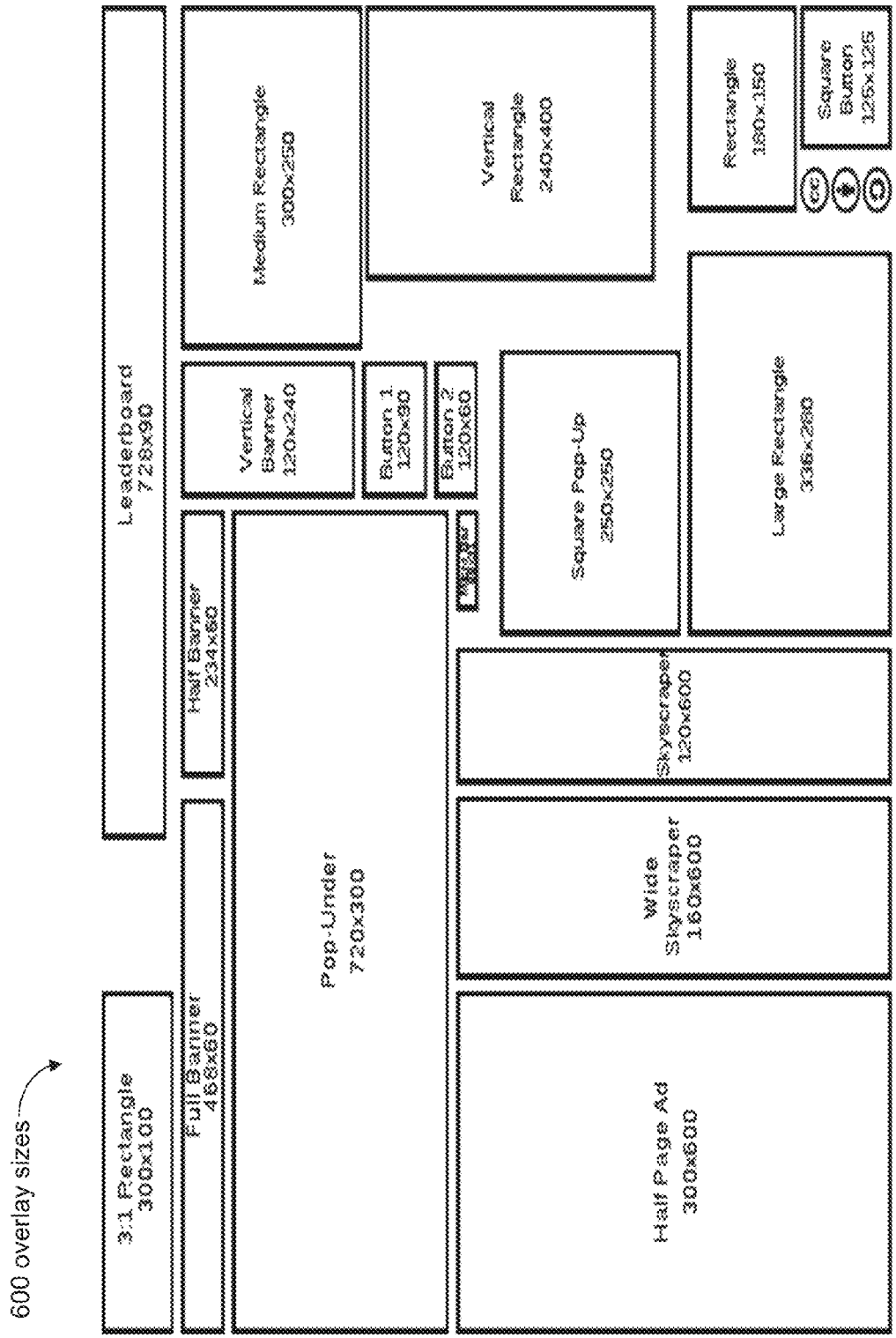
FIG. 6 illustrates exemplary overlay types and dimensions.

FIG. 6 illustrates exemplary overlay types and dimensions. The overlay sizes 600 with dimensions, which are expressed in terms of pixels in FIG. 6, generally comport with standard online advertisement sizes. The overlay sizes are labeled in FIG. 6 according to online advertising categories such as, for example, full banner, half banner, vertical banner, rectangle, square button, leaderboard, and pop-under. In certain embodiments, overlays 506 uploaded into overlay placement system are one of the overlay sizes 600 and when overlay placement system 130 determines where an overlay fits, the overlay's size 600 and dimensions in pixels is considered. According to one embodiment, overlay placement system optionally suggests locations where the originally sized overlay 506 and/or a resized overlay 506 having a different overlay size 600 can be placed within video content 404. For example, based on knowledge of standard overlay sizes 600, video processing module 116 can determine locations where each of the overlay sizes 600 will fit into video content 404. This can be an offline computation done after video content 404 has been uploaded and important objects within frames of the video content 404 have been identified. In this way, the 'fit' of potential overlays 506 having one of the standard overlay sizes 600 can be predicted based on knowledge of where overlays having one of the overlay sizes 600 can be placed within frames of video content 404 without overlapping any important objects. Later, when a specific overlay 506 with a given overlay size 600 is chosen for particular video content 404, the video-overlay matching module 120 will only need to look at the best possible placements for that particular overlay size 600, and choose one of the predicted locations.

If there are limited, or no predicted locations that the particular overlay size 600 will fit into, overlay placement system 130 can optionally present suggested locations where a resized overlay 506 can fit along with the relative monetary and/or salience costs of placing the resized overlay 506 in each of the suggested locations. For example, in cases where the resized overlay 506 has a smaller size than the original size, overlay placement system 130 can also present the lower monetary and/or salience cost of placing the smaller, resized overlay 506. Additionally, in cases where multiple predicted locations have been identified, video-overlay matching module 120 can choose the location that also results in a favorable color combination with the specific overlay 506. Also, if multiple predicted locations have been identified, video-overlay matching module 120 can optionally present the costs of placing the overlay 506 within each of the locations within a UI so that an advertiser user 114 can manually select one of the locations.

Figure 7:
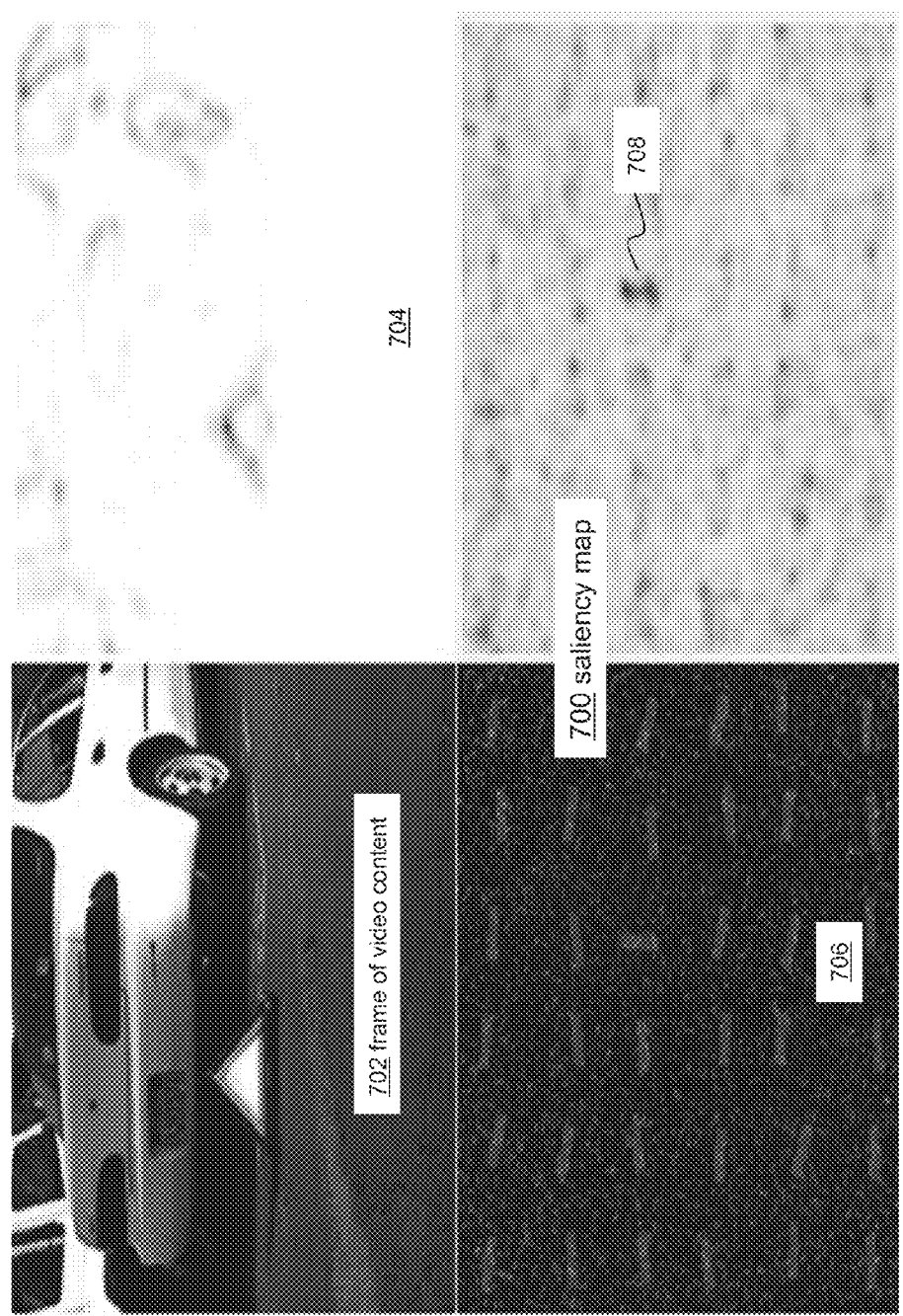
FIG. 7 depicts an example saliency map, in accordance with embodiments.

FIG. 7 depicts an example saliency map. In particular, FIG. 7 presents a final output of a saliency algorithm for two different images, a video frame 702 with a natural scene image, and another video frame 706 with an artificial image. More salient regions of a video frame typically have more discontinuities, which can be indicators important objects in such regions. Less salient regions have no or fewer important objects. Embodiments seek to avoid placing overlays in highly salient regions so as to avoid overlay locations that may overlap important objects. Alternative embodiments can use saliency maps to locate overlays in relatively salient, important regions that are likely to be of interest to a viewer user 114, while still avoiding placements that overlap with identified important objects. Saliency map 700 is a plot of values, each value representing the saliency, i.e., the importance, of the corresponding pixel in the image/frame 702. Because salience calculations can require relatively large amounts of resources from processor 123 and/or memory 124 of server 104, embodiments only compute the salience for one frame 702 of video content every second. However, this will not result in missing important objects in most video content, because if an important object appears in a scene, it is usually caught by at least one of the frames 702 whose salience is mapped. FIG. 7 shows the saliency that can be obtained for frame 702, with the saliency map 700 being encoded such that higher salience is represented by a more intense shading. A discontinuity 708 in saliency map 700 can be an indicator of an important object. The exemplary approach described below with reference to FIG. 7, namely, using a Fourier Transform and Quaternions, is one possible technique for computing saliency. Saliency map 700 can be generated to identify the relative importance of regions of a video frame 702 (i.e., regions containing one or more important objects).

Saliency for frames of video content 404 can be calculated in order to detect how salient regions in the frames are. The saliency of regions can be mapped in a saliency map such as the exemplary saliency map 700 shown in FIG. 7. In one embodiment, a 2D Fourier transform for an input image, such as frame 702 or 706 of video content, is computed. Then complex values resulting from the 2D Fourier transform are normalized such that each complex value has a modulus 1. Next, an inverse Fourier transform is performed. This way, components that appear frequently are reduced while discontinuities are enhanced (see, e.g., discontinuity 708 in FIG. 7). As a frequent component in the spatial domain corresponds to a greater coefficient at the corresponding position in a frequency domain, normalization will lead to diminution of that complex number from the frequency domain and will also lead to suppression of periodical components. In certain embodiments, multiple channels can be used to compute saliency by using complex numbers. These embodiments can detect discontinuities by using a generalized Fourier transform such as for example, a Quaternion Fourier transform. Quaternions represent generalizations of complex numbers, and can take the form: $Q=a+b \cdot i+c \cdot j+d \cdot k$, where a, b, c and d are real numbers. By using Quaternions, embodiments are able to integrate discontinuities over different maps (channels) in a natural way. For example, three of the four available channels can be used for static image analysis, while the fourth channel can incorporate temporal information (through the difference between frames 702), where channel 1 represents pixel intensity, channel 2 represents red-green contrast, channel 3 represents yellow-blue contrast, and channel 4 represents (t)–intensity (t–1) that models the motion in the given frame 702 as compared to the previous frame. Regarding channel 3 and red-green contrast, although the intensity of a red and a green color might be the same, red areas contrast with green areas. After executing the above-described saliency algorithm for an image, such as video frame 702, saliency map 700 is obtained. Embodiments use the saliency maps for multiple video frames to determine the relative salience of regions of the frames, where salience quantifies the presence of important objects within the regions.

According to embodiments, saliency calculations and maps are based in part on attention modeling. Modeling viewer user 114 attention can be an important consideration in overlay placement because knowing where a viewer user 114 is likely to look (or has looked) represents an essential clue of knowing a good placement for an overlay. In one embodiment, saliency-based visual attention modeling is performed for rapid analysis of scenes of video content. In one embodiment, multiple feature maps are generated for different type of features in the following way: given a feature (e.g., intensity), a region is deemed to be salient if the feature value in that region is very different compared to surrounding regions in the video frames. For each kind of feature, multiple maps are generated by using multiple resolutions (sizes): at least three different sizes can be considered for center region, and for each of these, at least two sizes are considered for surrounding regions, resulting in a number of at least six maps for each feature. In certain embodiments, the features used are intensity, color contrast (considering red-green and yellow-blue contrast) and orientation (considering 0, 45, 90, and 135 degrees of local orientations). In this way, attention modeling can obtain at least six maps for intensity, at least twelve maps for color, and at least twenty-four maps for orientation. These maps can then be combined into a single saliency map, such as saliency map 700.

According to embodiments, one or more of the following methods can be employed to compose saliency maps. Simple summing: all maps are normalized to a [0, 1] interval and then directly added. This is a baseline method and does not typically offer robust results. Normalization: according to this technique, saliency maps having a prominent maximum compared to other local maxima in the same saliency map become more important. As a result, if one feature one point is determined to be very salient, then this feature is deemed to be more important than other, less salient features. Iterative normalization: this technique is similar to normalization, except that it is a more biologically-related method, which can sometime return better results than normalization. Normalization may not be biologically plausible because it uses a global maximum, while the neurons in the cortex of a viewer user's 114 brain (responsible for analyzing visual signal) are known to be only locally connected. As the name implies, with iterative normalization, an iterative strategy is used, that attenuates the regions or zones of frames for which vicinities (i.e., adjacent regions in the frames) are similar. The iterative normalization technique starts with a saliency map which is normalized into [0, 1], and then performs attenuation/intensification of some regions (in the end the map will not be in [0, 1] anymore, therefore this method can be viewed as a procedure for offering different weights to different saliency maps). Lastly, a learning weights technique can be employed. This is a weight updating strategy that takes into account how well each saliency map emphasizes an identified target in video content. By training for a specific target within video content, the saliency maps that better represent or identify that target will receive bigger weights (e.g., if the target is red and the background is always green, then the color map within the saliency map will become more important).

Certain embodiments use a data driven approach for computing the salience map 700. Eye tracking data can be recorded for viewer users 114 on a plurality of frames of video content. In order to obtain continuous saliency maps from the eye fixation points, frames can be convolved with a Gaussian kernel at each fixation point. A number (at least ten positive and at least ten negative) of example pixels can be randomly extracted from each frame for training purposes. These points can be obtained from each frame by applying a threshold on the saliency map 700 obtained from eye tracking data, considering top 20% pixels as positive examples (fixated) and bottom 70% as negative examples. In certain embodiments, three types of features can be used: low-level features (e.g., contrast, orientation), midlevel features (a classifier can be used to determine pixels on the horizon line), high-level features (using a face detection algorithm such as, for example the Viola-Jones algorithm). Besides these, observations that viewer user 114 gazes tend to be concentrated at the center of the frame was used by taking into account the position of the pixel. All these features can be fed into a Support Vector Machine classifier.

The exemplary attention modeling methods described in the following paragraphs use saliency values and are indirectly related to overlay placement system 130. These attention modeling techniques can be used in conjunction with the overlay placement system 130 described above with reference to FIGS. 1A and 1B and the methods described below with reference to FIGS. 8 and 9. Embodiments use saliency in order to retarget frames on different displays (e.g., mobile client devices 134 such as tablet computers, smart phones, laptop computers, and portable DVD players). Certain of these embodiments use an attention model that detects the Attention Objects (AOs). Each AO is described by the following values: ROI (region of interest), AV (attention value), and MPS (minimal perceivable size). ROI indicates the area where the object is (and it is represented as a shape such as a rectangle). AV gives the importance of the object and MPS indicates how small the object can be made while still preserving its characteristics. According to these embodiments, saliency maps are generated as described above and then they are combined using iterative normalization strategy described above. When a saliency map is available, the AV at each pixel is computed by multiplying each pixels saliency with its brightness and then a Gaussian template is applied, knowing that people tend to look at the center of the frame. The MPS of each salient region can be heuristically computed (larger regions can be scaled more aggressively). Besides saliency, the attention modeling also incorporates top-down, semantic information by identifying faces and text. These are deemed to attract more attention (although they may not be salient from a bottom-up perspective). The AV of each face takes into account the face size and position (larger faces and faces detected in the center of a frame have a higher AV). In one embodiment, the MPS for faces can be fixed at 25×30=750 pixels. Also, text can be taken into account. For example, the AV of a text region can take into account the text area and the aspect ratio. Text position may not be deemed to be important, just the presence of text is determined. In an embodiment, a rule-based system can be employed to assign weights to these different sources. For example if there are faces with a very high AV, then the weight of the face component becomes large. For retargeting, embodiments seek to optimize an information fidelity" formula that tells how much information is preserved—for each AO, if its size is too small (using MPS) then its AV is set to 0.

One embodiment computes a visual attention model for video content skimming by extending a salience map or model for video content analysis. In this embodiment, an attention curve is generated in order to perform video content skimming. Video skimming refers to extracting the highlights of a video asset such as a movie. According to this embodiment, saliency is used for region-based frame retrieval. First, in order to calculate salience at each pixel in frames, the following algorithm can be used: any pixel x is compared to all pixels y in some region, zone, or neighborhood, taking into account color and orientation. The more different the feature in a specific pixel as compared to surrounding pixels, the more salient it is deemed. After this step, the salient objects are detected. In order to obtain these objects, the frame is transformed in grayscale and segmented. Next, using entropy theory, some video content segments with a high salience are selected. These segments are joined into objects. Finally, in order to compute the score of a frame in database 122 (this score is used to rank the frames in database 122, for performing a subsequent retrieval from database 122), for each salient object in the original frame, the most similar one in the current database frame is detected and a similarity measure is saved or recorded. These values are added, resulting therefore in a score for each frame in database 122.

Embodiments can detect surprising events in video content 404 and can improve temporal placement of overlays 506 based on the detected surprising events. Certain embodiments detect surprising events in video content based on saliency maps and as part of attention modeling. These embodiments define a surprise framework to incorporate elements from two complementary domains: saliency and novelty. Here, saliency can represent outliers in the spatial domain, while novelty works with the temporal domain of video content. In the novelty framework, one approach is to assume that each pixel's intensity in a frame comes from a mixture of Gaussians distribution. This way, in a video scene containing, for example, trees waving in wind, a new wind gust or change of direction might not cause much novelty, whereas a pedestrian or other important object appearing in the video scene would be successfully detected. Embodiments assume that probability distribution is not known beforehand. Instead, a Bayesian framework can be used so that every new piece of information in video content frames changes the probability distribution that models what the users expect to see. Divergence between the distributions before and after the new information is seen is used as a measure of how much novelty the information contains.

Other embodiments can employ a user attention model for video summarization. According to these embodiments, there are two types of video summarization: static video abstract and dynamic video skimming. Static video abstract attempts to obtain a set of key frames from video content that are representative. Dynamic video skimming seeks to find a set of video clips (video and audio) within video content that represent the entire video asset (with a much smaller total length in frames or duration). These embodiments use a framework for video summarization (both static and dynamic) that treat video content as containing three types of information: visual, audio, and linguistic. Different saliency maps are generated from one or more of these different sources and they are combined in order to generate an attention curve for the video content. The attention curve can be smoothed and the parts of the video asset around local maxima can be used as summary.

Exemplary Methods

FIG. 8 is a flow chart illustrating an example method 800 for suggesting overlay locations. For illustrative purposes, the method 800 is described with reference to the system and UI implementations described above with reference to FIGS. 1A, 1B and 3-7. Other implementations, however, are possible. Optional and/or additional portions of steps are indicated in the flowchart by parenthetical phrases (see, e.g., steps 806, 810, and 812).

The method 800 begins in step 802 where a saliency map is computed for multiple frames of video content 404. This step can comprise computing a saliency map similar to saliency map 700 for multiple frames 702 as described above with reference to FIG. 7. After the saliency map is computed for the frames, control is passed to step 804.

In step 804, an auxiliary matrix is computed. The auxiliary matrix can be used in method 800 to suggest optimal locations for placing an overlay by minimizing the sum of pixel saliencies, which are covered by the overlay over the frames 702 that the overlay appears in. Computing an auxiliary matrix from the saliency map in order to efficiently calculate the salience cost (total saliency covered) of each placement, wherein the auxiliary matrix is obtained by cumulating saliency values, can be done starting from the top-left pixel of the first frame. One embodiment of step 804 calculates or computes the auxiliary matrix, as Auxiliary[X][Y][T]=sum(saliency[x][y][t]), where the summation is through all x in $\{1, 2, \ldots X\}$, y in $\{1, 2, \ldots Y\}$ and t in $\{1, 2, \ldots T\}$, or:

$$\mathrm{Aux}[X][Y][T] = \sum_{t=1}^{T} \sum_{x=1}^{X} \sum_{y=1}^{Y} Cost(x, y, t)$$

where saliency is expressed as Cost. In this exemplary definition of the auxiliary matrix, X is from 1 to W (where W=width of a frame in pixels), Y is from 1 to H (where H is the height of a frame 702 in pixels), T is from 1 to L (where L is the length of video, in terms of the total number of frames 702). Thus, step 804 calculates the auxiliary matrix by cumulating saliency values from saliency maps. As described below with reference to step 808, this auxiliary matrix can subsequently be used to rapidly compute the total saliency covered by any overlay placement location.

Certain embodiments may only consider a subset of frames in order to speed up calculations by sampling video content and computing the auxiliary matrix and the saliency maps only for those sampled frames (e.g., 5 frames per second). In one embodiment, step 804 only considers frames 702 for which salience was calculated and mapped in step 802. In order to find and suggest an overlay position that minimizes salience cost, step 804 can verify each possible placement (restricting the overlay to start from one of the frames 702 with computed saliency), and suggest (or automatically choose) a location which leads to a minimal salience value. In order to efficiently compute the salience cost of a given overlay placement, step 804 can comprise computing an auxiliary matrix which takes O(W·H·T) to compute (where W and H represent the dimensions at which the video content is processed, and T is the duration or length of the video content in terms of the number of frames). In certain embodiments, the auxiliary matrix is computed only once, and each placement is evaluated in O(1). In this embodiment, there are O(W·H·T) possible placements, therefore the overall complexity of this algorithm is O(W·H·T). The auxiliary matrix is constructed in step 804 in order to be able to obtain the salience cost of any placement in O(1). An exemplary auxiliary matrix is a three dimensional matrix which contains at position (x, y, t) the sum of the saliencies of all the pixels in the (1, 1)–(x, y) rectangle, for all video frames from 1 to t. Using the inclusion-exclusion principle, step 808 is able to calculate the total salience in an arbitrary video volume determined by a possible placement using only a few additions and subtractions, in O(1) complexity. In an embodiment, step 804 can be performed by video-overlay matching module 120 and can be executed by processor 123 of server 104. After the auxiliary matrix is constructed, control is passed to step 806.

Next, in step 806, an overlay size is taken. Initially this can be one of the standard overlay sizes 600 shown in FIG. 6 or another size, in pixels, a given overlay has. After the overlay size is taken, control is passed to step 808.

In step 808, the salience cost for possible placements (i.e., locations) for the overlay is computed. In one embodiment, step 808 first computes the salience cost (total saliency covered) of every placement (i.e., every possible location of an overlay in video content, given the overlay size and duration). There can potentially be several hundred million or billions of potential overlay placement locations in one video asset. In one embodiment, based at least in part on the auxiliary matrix, constructed in step 804, step 808 rapidly calculates unobtrusiveness values of all locations within frames 702 of video content 404. The computation of salience costs and calculations of unobtrusiveness values can be made quickly through use of the auxiliary matrix. After computing the saliency costs, control is passed to step 810.

In step 810, locations determined to have the lowest salience costs in step 808 are suggested. In this step, a plurality of locations (e.g., 5 locations) with smallest saliency costs are determined. In one embodiment, these locations can be shown to a user, such as an advertiser user 114, who can then select one of the plurality of locations as the location for the overlay. In alternative embodiments where a fully automated overlay placement is sought, a location having the lowest salience cost is selected in step 810 without presenting suggested locations to a user. That is, step 810 can find the position with the lowest salience cost, and then place the overlay accordingly.

Next, in step 812, a determination is made as to whether there are additional overlay sizes and/or more overlays to insert. In some embodiments, method 800 is only used to determine one final placement for each overlay without resizing the overlay. If it determined that there are additional sizes or overlays, control is passed back to step 806. Otherwise, if it is determined that there are no more overlays to place or overlay sizes to select; control is passed to step 818 where method 800 ends.

FIG. 9 is a flow chart illustrating an example method 900 for placing an overlay in video content. For illustrative purposes, the method is described with reference to the system and UI implementations depicted in FIGS. 1A, 1B and 3-7. Other implementations, however, are possible. Optional and/or additional portions of steps are indicated in the flowchart by parenthetical phrases (see, e.g., steps 908, 910, 912, and 914).

The method 900 begins at step 902 where video content and an indication of overlays are received. This step can comprise receipt of uploaded video assets and overlays at server 104 via publisher UI 108 and advertiser UI 110 and video and overlay processing performed by video processing module 116 and overlay processing module 118 as described above with reference to FIGS. 1A and 1B.

Next, in step 904, locations are determined for one or more overlays received in step 902 and salience costs are calculated. In certain embodiments, step 904 can comprise allowing overlays to change their position in video content. Changing the position may allow an overlay to avoid overlapping salient regions that could not otherwise be avoided. One procedure for step 904 is to set a speed variable for each overlay, penalizing large velocities. The saliency cost function can be defined as:

$$\text{Cost} = (\alpha + v^\beta) \Sigma_{t=T_0}^{T} \Sigma_{x=1}^{X} \Sigma_{y=1}^{Y} \text{salience}(x, y, t)$$

Step 904 can use a stochastic algorithm that tries various random locations (starting moment, position, speed), evaluates the salience cost for each of the locations, and selects the best performing location. In an embodiment, step 904 can be performed by video-overlay matching module 120 and creating a saliency map 700 as described above with reference to FIGS. 1A, 1B and 7.

In addition to finding an optimal position for a single overlay in video content, an embodiment of step 904 can find locations for multiple overlays in the same video content. One embodiment uses the following 'greedy' selection strategy in order to place multiple overlays in a video: first, the optimal location is chosen for a first overlay of the one more overlays received in step 902. In one embodiment, overlays can be considered in the order received in step 902. In another embodiment, overlays are considered in the order matched by an overlay selection made by video-overlay matching module 120, which can be based at least in part on the color respective color palettes/schemes of the overlays and the video content. Locations for each overlay are then determined by only considering the positions that do not overlap with previously placed overlays or other overlays. Overlays are considered to overlap if they appear in the same time (i.e., same frames), or if the spatial distance (in pixels) or temporal distance (in time or frames) between the overlays is below a predefined, tunable threshold. In one embodiment, an administrator tunable temporal threshold is 1 second. By using this greedy selection strategy, step 904 will determine locations such that either overlays do not overlap, or more than one overlay will not appear at the same time (i.e., in the same frame) in video content.

In one embodiment, step 904 can also use scene segmentation information obtained from video processing done by video processing module 116 in order to avoid determining locations for overlays that will result in the overlays cross the boundaries between scenes (i.e., span multiple scenes or DVD chapters). Timestamp data (i.e., in milliseconds) for scene and chapter transitions stored in database 122 for video content by video processing module 116 can be used to determine temporal overlay locations that will not span scenes and chapters.

In additional or alternative embodiments, step 904 can comprise estimating high interest scenes in order to determine overlay locations in such high interest scenes. For example, scenes generating a high interest can be determined based in part on highly dynamic color changes. In cases where there are faster changes in color from one frame to the next frame as compared to other frame sequences in video content, the frames with faster, more dramatic color changes can be deemed to comprise part of high interest scenes in the video content. After locations for the one or more overlays are determined, control is passed to step 908 in cases where the locations are to be presented to a user for manual selection, control is passed to step 910 in cases where overlay transformations are to be performed in a fully automated implementation of method 900, or to step 916 in fully automated implementations of method 900 without overlay transformations.

In optional step 908, a plurality of the locations determined in step 904 are presented to a user within a UI as suggested locations. In embodiments, step 908 presents an administrator tunable, finite number of the highest-ranked locations to an advertiser user 114 within administrator UI 300. In one non-limiting embodiment, the default number of suggested locations is five. In fully automated overlay placement methods, steps 908-914 are skipped.

In optional step 914, selections of locations for overlays are received and control is optionally passed to step 910. In an embodiment, step 914 can be performed by receiving a selection of a location to place each of the one or more overlays from an advertiser user 114 interacting with administrator UI 300.

In step 910, transformations for overlays are identified. If it is determined that the overlays need to be (or can be) transformed to better fit with video content, control is passed to step 912 where the identified transformations are applied.

In step 912, the transformations identified in step 910 are applied to the overlays. As described above with reference to FIGS. 1A and 1B, the transformations can include spatial (i.e., reshaping), color, translucency, transparency, and/or resizing transformations. In embodiments, step 912 can comprise applying two main types of effects so that an overlay fits better into video content received in step 902. The first type includes spatial transformations that move the corners of an overlay so that it fits better into the context of video content, and then apply affine transformation, which makes the rectangular overlay become a reshaped overlay with new corners. The second type includes color transformations such as gradually increasing the transparency of the overlay as a function of proximity to edges of the overlay, thus making a smooth transition between the overlay and surrounding portions of frames of video content.

Next, in step 916, the overlay is placed within the video content at the selected (or automatically identified) location in order to create edited video content. In an embodiment, step 916 can be performed by delivering the overlays to viewer users 114 via HyperText Markup Language 5 (HTML5), using the <video> tag or video element of HTML5. This embodiment allows the use of Cascading Style Sheets (CSS) Shaders, which define a filter effects extensibility mechanism and provide rich, easily animated visual effects to HTML5 content. In particular, it allows applying vertex and fragment shading controls directly on HTML elements, including image and video elements in HTML5. In one embodiment, this step results in creation of a rendition 125 of the video content to be delivered, via network 106, to a video player 112 executing on a client device 134. After the overlay is placed, control is passed to step 918 where method 900 ends.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Exemplary Computer System Implementation

Figure 10:
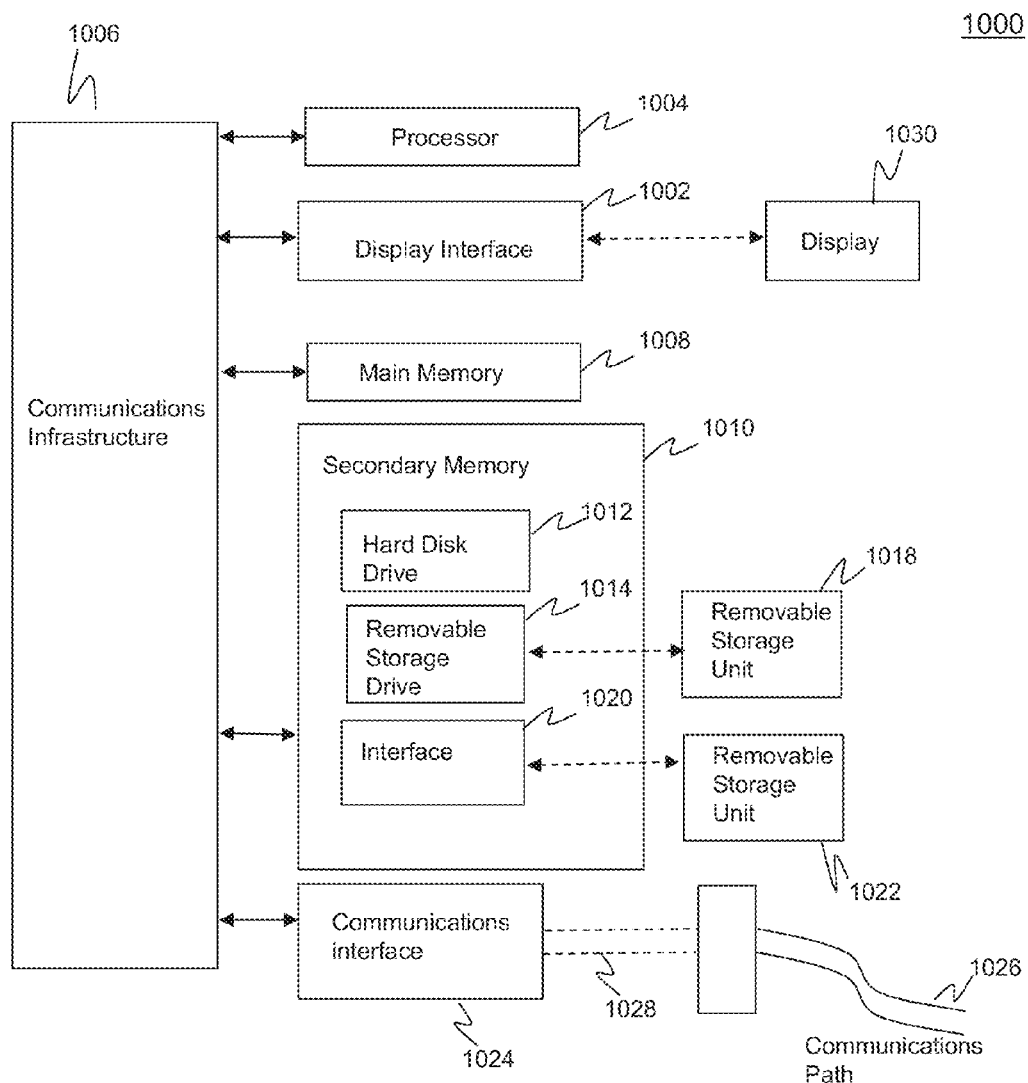
FIG. 10 is a diagram of an exemplary computer system in which embodiments of the present disclosure can be implemented.

Although exemplary embodiments have been described in terms of charging apparatuses, units, systems, and methods, it is contemplated that certain functionality described herein may be implemented in software on microprocessors, such as processors 126a-n and 128 included in the client devices 134a-n and server 104, respectively, shown in FIG. 1B, and computing devices such as the computer system 1000 illustrated in FIG. 10. In various embodiments, one or more of the functions of the various components may be implemented in software that controls a computing device, such as computer system 1000, which is described below with reference to FIG. 10.

Aspects of the present invention shown in FIGS. 1-9, or any part(s) or function(s) thereof, may be implemented using hardware, software modules, firmware, tangible computer readable media having logic or instructions stored thereon, or a combination thereof and may be implemented in one or more computer systems or other processing systems.

FIG. 10 illustrates an example computer system 1000 in which embodiments of the present invention, or portions thereof, may be implemented as computer-readable instructions or code. For example, some functionality performed by client devices 134a-n and server 104 shown in FIGS. 1A and 1B, can be implemented in the computer system 1000 using hardware, software, firmware, non-transitory computer readable media having instructions stored thereon, or a combination thereof and may be implemented in one or more computer systems or other processing systems. Hardware, software, or any combination of such may embody certain modules and components used to implement steps in the methods 800 and 900 illustrated by the flowcharts of FIGS. 8 and 9 discussed above and the user interfaces 300 and 400 discussed above with reference to FIGS. 3 and 4.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the invention are described in terms of this example computer system 1000. After reading this description, it will become apparent to a person skilled in the relevant art how to implement the embodiments using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 1004 may be a special purpose or a general-purpose processor device. As will be appreciated by persons skilled in the relevant art, processor device 1004 may also be a single processor in a multi-core/multiprocessor system, such system operating alone, or in a cluster of computing devices operating in a cluster or server farm. Processor device 1004 is connected to a communication infrastructure 1006, for example, a bus, message queue, network, or multi-core message-passing scheme. In certain embodiments, one or more of the processors 123 and 126*a-n* described above with reference to overlay placement system 130, server 104, and client devices 134*a-n* of FIG. 1B can be embodied as the processor device 1004 shown in FIG. 10.

Computer system 1000 also includes a main memory 1008, for example, random access memory (RAM), and may also include a secondary memory 1010. Secondary memory 1010 may include, for example, a hard disk drive 1012, removable storage drive 1014. Removable storage drive 1014 may comprise a magnetic tape drive, an optical disk drive, a flash memory, or the like. In non-limiting embodiments, one or more of the memories 124 and 128*a-n* described above with reference to server 104 and client devices 134*a-n* of FIG. 1B can be embodied as the main memory 1008 shown in FIG. 10.

The removable storage drive 1014 reads from and/or writes to a removable storage unit 1018 in a well-known manner. Removable storage unit 1018 may comprise a magnetic tape, optical disk, etc. which is read by and written to by removable storage drive 1014. As will be appreciated by persons skilled in the relevant art, removable storage unit 1018 includes a non-transitory computer readable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000. In non-limiting embodiments, one or more of the memories 124 and 128*a-n* described above with reference to server 104 and client devices 134*a-n* of FIG. 1B can be embodied as the main memory 1008 shown in FIG. 10.

Computer system 1000 may also include a communications interface 1024. Communications interface 1024 allows software and data to be transferred between computer system 1000 and external devices. Communications interface 1024 may include a modem, a network interface (such as an Ethernet card), a communications port, a PCMCIA slot and card, or the like. Software and data 1028 transferred via communications interface 1024 may be in the form of signals, which may be electronic, electromagnetic, optical, or other signals capable of being received by communications interface 1024. These signals may be provided to communications interface 1024 via a communications path 1026. Communications path 1026 carries signals and may be implemented using wire or cable, fiber optics, a phone line, a cellular phone link, an RF link or other communications channels.

As used herein, the terms "computer readable medium" and "non-transitory computer readable medium" are used to generally refer to media such as memories, such as main memory 1008 and secondary memory 1010, which can be memory semiconductors (e.g., DRAMs, etc.). Computer readable medium and non-transitory computer readable medium can also refer to removable storage unit 1018, removable storage unit 1022, and a hard disk installed in hard disk drive 1012. Signals carried over communications path 1026 can also embody the logic described herein. These computer program products are means for providing software to computer system 1000.

Computer programs (also called computer control logic) are stored in main memory 1008 and/or secondary memory 1010. Computer programs may also be received via communications interface 1024. Such computer programs, when executed, enable computer system 1000 to implement the present invention as discussed herein. In particular, the computer programs, when executed, enable processor device 1004 to implement the processes of the present invention, such as the steps in the methods 800 and 900 illustrated by the flowcharts of FIGS. 8 and 9, discussed above. Accordingly, such computer programs represent controllers of the computer system 1000. Where an embodiment of the invention is implemented using software, the software may be stored in a computer program product and loaded into computer system 1000 using removable storage drive 1014, interface 1020, and hard disk drive 1012, or communications interface 1024.

In an embodiment, the display devices 121*a-n* used to display interfaces of video player 112, publisher UI 108, and/or advertiser UI 110, may be a computer display 1030 shown in FIG. 10. The computer display 1030 of computer system 1000 can be implemented as a touch sensitive display (i.e., a touch screen). Similarly, the user interfaces shown in FIGS. 8 and 4 may be embodied as a display interface 1002 shown in FIG. 10.

Embodiments of the invention also may be directed to computer program products comprising software stored on any computer readable medium. Such software, when executed in one or more data processing device, causes a data processing device(s) to operate as described herein. Embodiments employ any computer readable medium. Examples of computer useable mediums include, but are not limited to, primary storage devices (e.g., any type of random access memory), secondary storage devices (e.g., hard drives, floppy disks, CD ROMS, DVDs, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

General Considerations

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing device memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing device from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the steps presented in the examples above can be varied—for example, steps can be re-ordered, combined, and/or broken into sub-steps. Certain steps or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A computer-implemented method for placing an overlay in video content, the method comprising:
    receiving, at an overlay server, video content;
    receiving, at the overlay server, an indication of an overlay to be placed in the received video content, the overlay being an item of electronic content including one or more of text, image, and multimedia content;
    generating, by an attention modeling module of the overlay server, saliency maps indicating relative salience of regions within frames of the video content based upon feature values in a region differing from other feature values in regions adjacent to the region;
    computing an auxiliary matrix by cumulating saliency values from the saliency maps;
    identifying, based on the saliency maps and the properties of the overlay, a plurality of unobtrusive locations where the overlay can be placed within the frames of the video content, wherein the unobtrusive locations are in lower salience regions;
    calculating unobtrusiveness values of the plurality of unobtrusive locations, the calculating being based at least in part on the auxiliary matrix;
    determining, by the overlay server, based on properties of the overlay, the unobtrusiveness values, and properties of the video content, an optimal location from amongst the plurality of unobtrusive locations where the overlay can be placed within the video content; and
    placing the overlay in the optimal location.

2. The method of claim 1, further comprising, prior to the placing:
    presenting the plurality of unobtrusive locations in a user interface on a display of the computing device as suggested locations for the overlay;
    receiving a selection of one of the suggested locations;
    identifying, based at least in part on the selected location and properties of the overlay, one or more overlay transformations; and
    applying, by the overlay server, the identified one or more overlay transformations to the overlay to produce a transformed overlay,
    wherein the placing comprises placing the transformed overlay in the selected location.

3. The method of claim 2, wherein the one or more overlay transformations comprise one or more of a spatial transformation, a color transformation, and a translucency transformation.

4. The method of claim 1, further comprising:
    storing, in a data store, the video content with the placed overlay as edited video content.

5. The method of claim 1, wherein the received video content is received as a complete video.

6. The method of claim 1, wherein the received video content is a video stream.

7. The method of claim 1 wherein:
    the received video content comprises three dimensional (3D) video content;
    the properties of the overlay include a depth dimension of the overlay; and
    the depth dimension is in terms of pixels.

8. The method of claim 1, wherein the properties of the overlay include:
    size;
    a color palette or scheme; and
    duration.

9. The method of claim 8 wherein the size property of the overlay includes dimensions of the overlay in pixels, and wherein the duration includes an amount of frames, a number of seconds, or fractions thereof.

10. The method of claim 1, wherein the overlay is an advertisement, and wherein the properties of the advertisement include:
    monetary cost per placement;
    duration; and
    product or service category.

11. The method of claim 1, wherein the determining comprises calculating a salience cost for each of the plurality of unobtrusive locations, the salience cost being based at least in part on the properties of the overlay.

12. The method of claim 1, wherein the unobtrusiveness of locations in the video content is based in part on the saliency maps generated by the attention modeling module for the frames of the video content.

13. The method of claim 1, wherein:
higher salience regions have been predicted by the attention modeling module to be more likely to be considered interesting by a viewer of the video content as compared to lower salience regions; and
the feature values include one or more of: color contrast; pixels on a horizon line in the region; intensity; brightness; and features of an object in the region, wherein the features of the object comprise a local orientation of the object, a presence of text in the object, and a presence of a face in the object.

14. The method of claim 1,
wherein calculating the unobtrusiveness values comprises using the auxiliary matrix to rapidly calculate the unobtrusiveness values of the plurality of unobtrusive locations within the frames of the video content.

15. The method of claim 1, further comprising identifying one or more overlay transformations including at least a spatial transformation, wherein the identifying one or more overlay transformations comprises scanning the frames of the video content to detect substantially straight lines proximate to lower salience regions, and wherein the spatial transformation includes reshaping the overlay so that one or more sides of the overlay are substantially parallel with at least one of the lines.

16. A system comprising:
an input device;
a display device;
a processor; and
a memory having instructions stored thereon that, if executed by the processor, cause the processor to perform operations for inserting an overlay into video content, the overlay being an item of electronic content including one or more of text, image, and multimedia content, the operations comprising:
receiving an indication of an overlay to be placed in the video content;
performing attention modeling on frames of the video content to identify zones in the video content and to generate saliency maps having saliency values indicating relative salience of regions within the frames of the video content based upon feature values in a region differing from feature values in surrounding regions;
determining, based on the saliency maps and the properties of the overlay, a plurality of unobtrusive locations within the identified zones at which the overlay can be inserted without overlapping with one or more objects, wherein the unobtrusive locations are in lower salience regions;
identifying one or more overlay transformations including at least a spatial transformation, the identifying comprising scanning the frames of the video content to detect substantially straight lines proximate to lower salience regions, wherein the spatial transformation includes reshaping the overlay so that one or more sides of the overlay are substantially parallel with at least one of the lines;
identifying, based on the attention modeling, an optimal location from amongst the plurality of unobtrusive locations;
inserting the overlay into the optimal location; and
rendering, on the display device, the video content with the inserted overlay.

17. The system of claim 16, the operations further comprising, prior to the rendering:
presenting, in a user interface on the display device, at least some of the plurality of unobtrusive locations within the identified zones where the overlay can be inserted into;
receiving, via the input device, a selection of a location within one of the identified zones; and
applying the one or more overlay transformations to the overlay, wherein the one or more overlay transformations further include one or more of:
a color transformation to change an edge of the overlay to substantially match colors of pixels of the video content adjacent to the selected location;
a spatial transformation to reshape or resize the overlay to substantially conform to an object in the video content proximate to the selected location; and
a translucency transformation to gradually increase translucency of the overlay relative to distance from a center of the overlay to edges of the overlay so that the edges of the overlay are substantially transparent.

18. The system of claim 17, the operations further comprising:
calculating respective salience costs for inserting the overlay into each of the presented locations;
receiving, via the input device, a request to move the overlay from the optimal location to another one of the plurality of unobtrusive locations;
inserting the overlay into the another one of the plurality of unobtrusive locations; and
rendering, on the display device, the video content with the inserted overlay.

19. The system of claim 16, wherein the performing the attention modeling comprises identifying visually unobtrusive locations within the identified zones where the overlay can be inserted into, the visually unobtrusive locations being locations not overlapping with relatively highly salient regions within the frames of the video content.

20. The system of claim 16, the operations further comprising:
receiving, via the input device, a request to resize the overlay from an initial size to a selected size;
resizing the overlay from the initial size to the selected size to produce a resized overlay;
inserting the resized overlay into the optimal location; and
rendering, on the display device, the video content with the inserted, resized overlay.

21. A computer readable storage medium having executable instructions stored thereon, that, if executed by a computing device, cause the computing device to perform operations for placing an overlay in video content, the instructions comprising:
instructions for receiving video content;
instructions for receiving an indication of an overlay to be placed in the received video content, the overlay being an item of electronic content including one or more of text, image, and multimedia content;
instructions for generating saliency maps indicating relative salience of regions within frames of the video content based upon feature values in a region differing from other feature values in regions adjacent to the region;
instructions for computing an auxiliary matrix by cumulating saliency values from the saliency maps;

instructions for identifying, based on the saliency maps and the properties of the overlay, a plurality of unobtrusive locations where the overlay can be placed within the frames of the video content, wherein the unobtrusive locations are in lower salience regions;

instructions for calculating unobtrusiveness values of the plurality of unobtrusive locations, the calculating being based at least in part on the auxiliary matrix;

instructions for determining, based on properties of the overlay, the unobtrusiveness values, and properties of the video content, an optimal location from amongst the plurality of unobtrusive locations where the overlay can be placed within the video content; and instructions for placing the overlay in the optimal location.

* * * * *